(12) United States Patent
Matthews et al.

(10) Patent No.: US 8,474,173 B2
(45) Date of Patent: Jul. 2, 2013

(54) SIGHT SYSTEM

(75) Inventors: John W. Matthews, Newport Beach, CA (US); Mark Buczek, Oceanside, CA (US); Mark Squire, San Diego, CA (US)

(73) Assignee: SureFire, LLC, Fountain Valley, CA (US)

( * ) Notice: Subject to any disclaimer, the term of this patent is extended or adjusted under 35 U.S.C. 154(b) by 93 days.

(21) Appl. No.: 12/914,597

(22) Filed: Oct. 28, 2010

(65) Prior Publication Data

US 2012/0102808 A1 May 3, 2012

(51) Int. Cl.
*F41G 1/35* (2006.01)

(52) U.S. Cl.
USPC .................... 42/130; 42/117; 42/113; 42/123

(58) Field of Classification Search
USPC .................. 42/113, 117, 122, 123, 130, 132, 42/133, 140
See application file for complete search history.

(56) References Cited

U.S. PATENT DOCUMENTS

| | | | |
|---|---|---|---|
| 3,230,627 A | | 1/1966 | Rickert et al. |
| 3,645,635 A | | 2/1972 | Steck |
| 3,994,597 A | * | 11/1976 | Calder et al. .................. 356/251 |
| 4,806,007 A | | 2/1989 | Bindon |
| 5,140,151 A | * | 8/1992 | Weiner et al. ............. 359/226.2 |
| 5,924,234 A | | 7/1999 | Bindon et al. |
| 6,487,809 B1 | | 12/2002 | Gaber |
| 6,490,060 B1 | | 12/2002 | Tai et al. |
| 7,069,685 B2 | | 7/2006 | Houde-Walter |
| 7,325,354 B2 | | 2/2008 | Grauslys et al. |
| 7,421,816 B2 | * | 9/2008 | Conescu .......................... 42/122 |
| 7,656,579 B1 | * | 2/2010 | Millett .......................... 359/400 |
| 7,721,481 B2 | | 5/2010 | Houde-Walter |
| 7,796,329 B2 | | 9/2010 | Dobschal et al. |

(Continued)

FOREIGN PATENT DOCUMENTS

| | | |
|---|---|---|
| DE | 202007010552 | 10/2007 |
| DE | 102009056208 | 7/2010 |

(Continued)

OTHER PUBLICATIONS

Burris Company: "AR-332 Prism Sight", Sep. 21, 2010, http://webarchive.org/web/20100921180853/http://www.burristactical.com/ar332,html, retrieved Jan. 20, 2012.

(Continued)

*Primary Examiner* — Daniel J Troy
(74) *Attorney, Agent, or Firm* — Haynes and Boone, LLP

(57) ABSTRACT

A sight system is provided which may be selectively used in a variety of different ways. In one example, the sight system may be positioned on a rifle to provide a rifle sight system. In this example, the sight system may be positioned on the rifle barrel a substantial distance away from a user's eye. Advantageously, such an implementation may permit a user to effectively sight the rifle without compromising situational awareness. In another example, the sight system may be used to provide a reflex sight with a reticle (e.g., a dot, crosshair, mark, or other appropriate shape) superimposed on an image (e.g., a zoomed or non-zoomed image) displayed from a camera. In another example, the sight system may be used to provide an occluded sight in which a camera and/or display of the sight system is disabled. As a result, a reticle may be displayed over an opaque background.

45 Claims, 21 Drawing Sheets

U.S. PATENT DOCUMENTS

| | | | |
|---|---|---|---|
| 7,866,247 B2 * | 1/2011 | Son et al. | 89/27.3 |
| 2005/0057808 A1 | 3/2005 | Houde-Walter | |
| 2006/0010761 A1 | 1/2006 | Staley | |
| 2006/0230665 A1 | 10/2006 | Narcy et al. | |
| 2008/0163536 A1 | 7/2008 | Koch et al. | |
| 2010/0095578 A1 | 4/2010 | Elpedes | |

FOREIGN PATENT DOCUMENTS

| | | |
|---|---|---|
| EP | 0 548 625 | 6/1993 |
| GB | 869627 | 5/1961 |
| GB | 1405122 | 9/1975 |
| GB | 1 579 796 | 11/1980 |
| GB | 2428929 | 2/2007 |
| WO | WO-2009/137860 | 11/2009 |

OTHER PUBLICATIONS

Brownelis: "AR-332 Prism Sight", Jan. 1, 2012, http://www.brownells.com/.aspx/pid=31976/Product/AR-332-PRISM-SIGHT, retrieved Jan. 20, 2012.

Advanced Combat Optical Gunsight, http://en.wikipedia.org/wiki/Advanced_Combat_Optical_Gunsight, pp. 1-3, May 15, 2010.

msnbc.com, New device could improve marksmanship, http://www.msnbc.msn.com/id/34384750/ns/technology_and_science-innovation/, pp. 1-2, Dec. 11, 2009.

Texas Instruments DLP in the Optoma Pico-Projector, Technology Insider, http://chipworks.com/blogs.aspx?id=5618&blogid=86, pp. 1-2, Jan. 12, 2009.

Reticle, http://en.wikipedia.org/wiki/Reticle, pp. 1-4, Jul. 22, 2009.

Reflex sight, http://en.wikipedia.org/wiki/Reflex_sight, pp. 1-4, Jul. 24, 2009.

U.S. Appl. No. 12/785,781, Matthews et al.

American Rifleman, Burris Eliminator Laserscope, Aug. 2011, pp. 86-87.

Schmidt-Pechan prism, http://en.wikipedia.org/wiki/Schmidt%E2%80%93Pechan_prism, Aug. 21, 2011, pp. 1-3.

Telescopic sight, http://en.wikipedia.org/wiki/Telescopic_sight, pp. 1-15, Oct. 18, 2011.

U.S. Appl. No. 13/281,166, title: Sight System, filed Oct. 25, 2011, inventors: Matthews et al., 81 pages.

U.S. Appl. No. 13/359,925, title: Gun Sight, filed Jan. 27, 2012, inventors: Matthews et al., 53 pages.

* cited by examiner

SIGHT SYSTEM

BACKGROUND

1. Technical Field

The present disclosure generally relates to sighting devices and more particularly to sight systems that generate a beam of light that enters a user's eye to produce a luminous reticle such as a dot or mark that is utilized for aiming small arms or other devices.

2. Related Art

Various types of sighting devices have been developed to enable the user of small arms such as handguns, rifles, shotguns, and submachine guns to aim these weapons. Each of these devices has its own advantages and disadvantages with respect to simplicity, ruggedness, size, weight, cost, accuracy, usability in different ambient light level, speed of use, maintenance of situational awareness, and efficacy in developing both reactive and precision shooting skills through both live fire and dry fire practice. Examples of such sighting devices include: open sights, telescopic sights, laser sights, "reflex" or "red dot" sights, night vision sights, and thermal or fused night/vision thermal sights.

One particular problem associated with conventional sighting devices is the loss of situational awareness experienced by users. For example, when aiming a weapon or other device using conventional sighting devices, a user is often forced to focus on a narrow field of view corresponding to a desired target or an immediate area near the target. Unfortunately, this narrow field of view may cause the user to lose situational awareness. Specifically, the user may be unaware of other events occurring outside a target area. In combat situations, such events may include the actions of adversaries or the existence of hostile environmental conditions. Thus, the user may be placed at high risk when using sighting devices which limit the user to only a narrow field of view.

Another problem associated with conventional sighting devices is a lack of flexibility. For example, users may be accustomed to using certain types of sighting devices such as telescopic sights or reflex sights. However, many existing sighting devices permit the user to use only a single sighting method. Moreover, if a user desires to change the method of sighting (e.g., to use different types of sights in different conditions), it may be cumbersome and impractical for the user to replace one type of sighting device for another type, especially in stressful or combat situations. As a result, users are often forced to adapt their skills to use a particular available type of sighting device, rather than the sighting device adapting to the user. Accordingly, there is a need for an improved sighting device.

SUMMARY

In accordance with various embodiments described herein, a sight system (e.g., also referred to as an aiming system) is provided which may be selectively used in a variety of different ways. For example, the sight system may be positioned on a rifle to provide a rifle sight system. In one embodiment, the sight system may be positioned on and substantially parallel to a rifle barrel. While positioned in this manner, the sight system may be located a substantial distance away from a user's eye. Advantageously, such an implementation may permit a user to effectively sight the rifle without blocking the user's peripheral vision and without compromising situational awareness.

In one embodiment, a sight system may be implemented with a camera and a display for providing video images to a user. The images may be continuously streamed to the display and/or other destinations to provide dynamic imaging of a target scene. The images may be provided to a user along with a red dot or other type of reticle (e.g., one or more dots, crosshairs, diamonds, chevrons, marks, or other appropriate shapes) to aid the user in sighting a rifle or other appropriate device. For example, the sight system may be used to provide a reflex sight with a red dot superimposed on an image displayed from a camera. As another example, the sight system may be used to provide an occluded sight in which a camera and/or display of the sight system may be selectively disabled. As a result, a red dot may be displayed over an opaque background.

In one embodiment, a sight system may provide zoomed images on a display using, for example, optical zoom and/or digital zoom features (e.g., telescopic zoom features) of a camera and/or a processing block. As a result, images of a target scene may be magnified as desired by a user. By combining such zoom capabilities with reflex sight features, a single sight system may be used in place of separate red dot sight and zoom sight devices. As a result, the number of devices operated by the user may be reduced.

In one embodiment, a sight system includes a camera adapted to capture images of a target scene; and a projector comprising: a display adapted to present the images; a beam combiner adapted to pass the presented images to a user of the sight system; and a light source adapted to project a reticle to the beam combiner, wherein the beam combiner is adapted to reflect the reticle to the user.

In one embodiment, a method of operating a sight system includes capturing images of a target scene using a camera; selectively presenting the images on a display; passing any of the presented images through a beam combiner to a user of the sight system; projecting a reticle from a light source to the beam combiner; and reflecting the reticle from the beam combiner to the user.

In one embodiment, a sight system includes means for capturing images of a target scene; means for presenting the images; means for passing the presented images to a user of the sight system; means for projecting a reticle; and means for reflecting the reticle to the user.

Advantageously, various embodiments further described herein may provide flexibility in the use and operation of sight systems. For example, users familiar with reflex sights or occluded sights may configure the sight system to emulate the operation of reflex or occluded sights as may be desired in particular applications.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
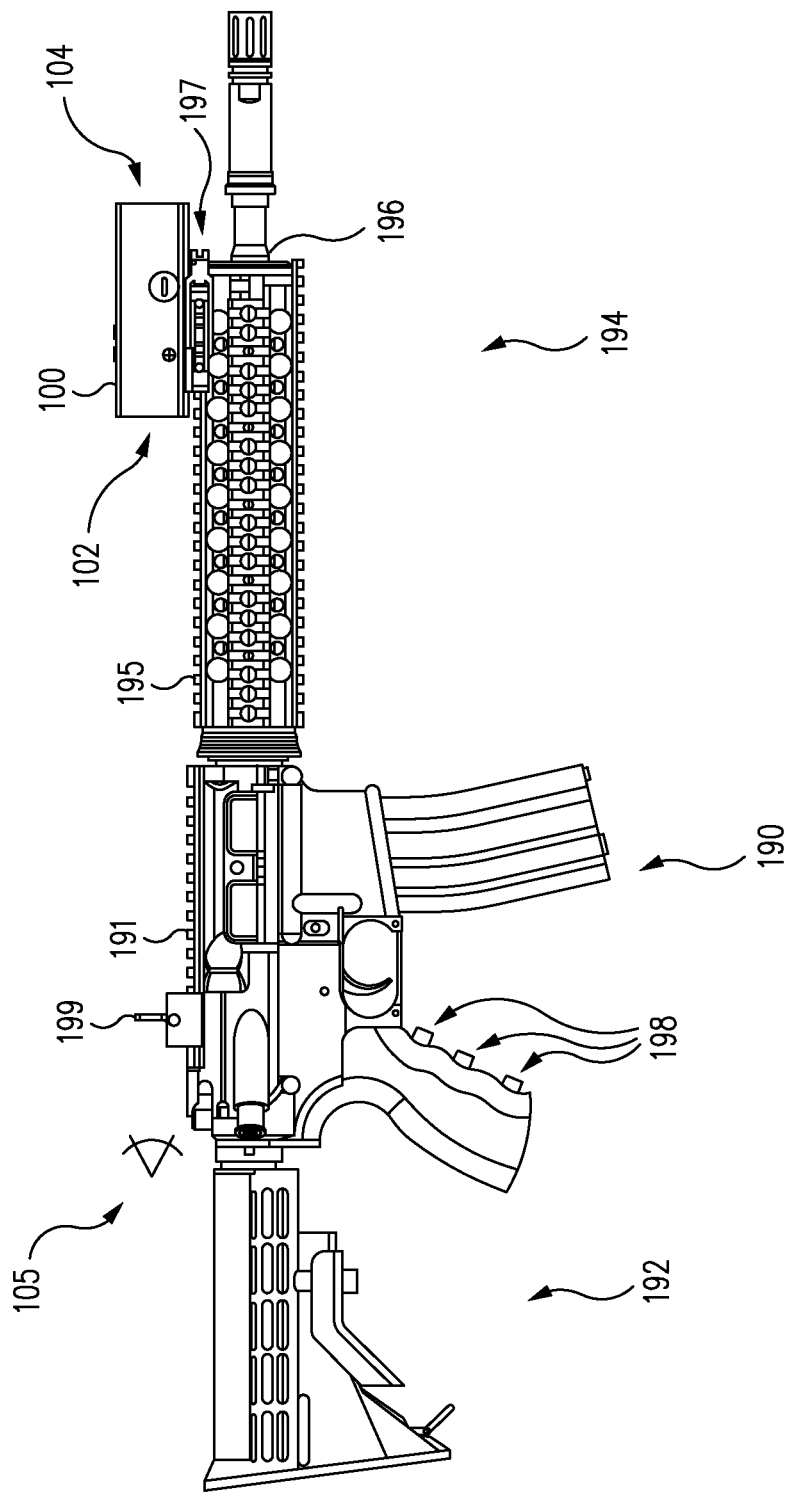
FIGS. 1A-C illustrate several views of a sight system including an integrated camera mounted on a rifle in accordance with various embodiments of the disclosure.
Figure 1B:
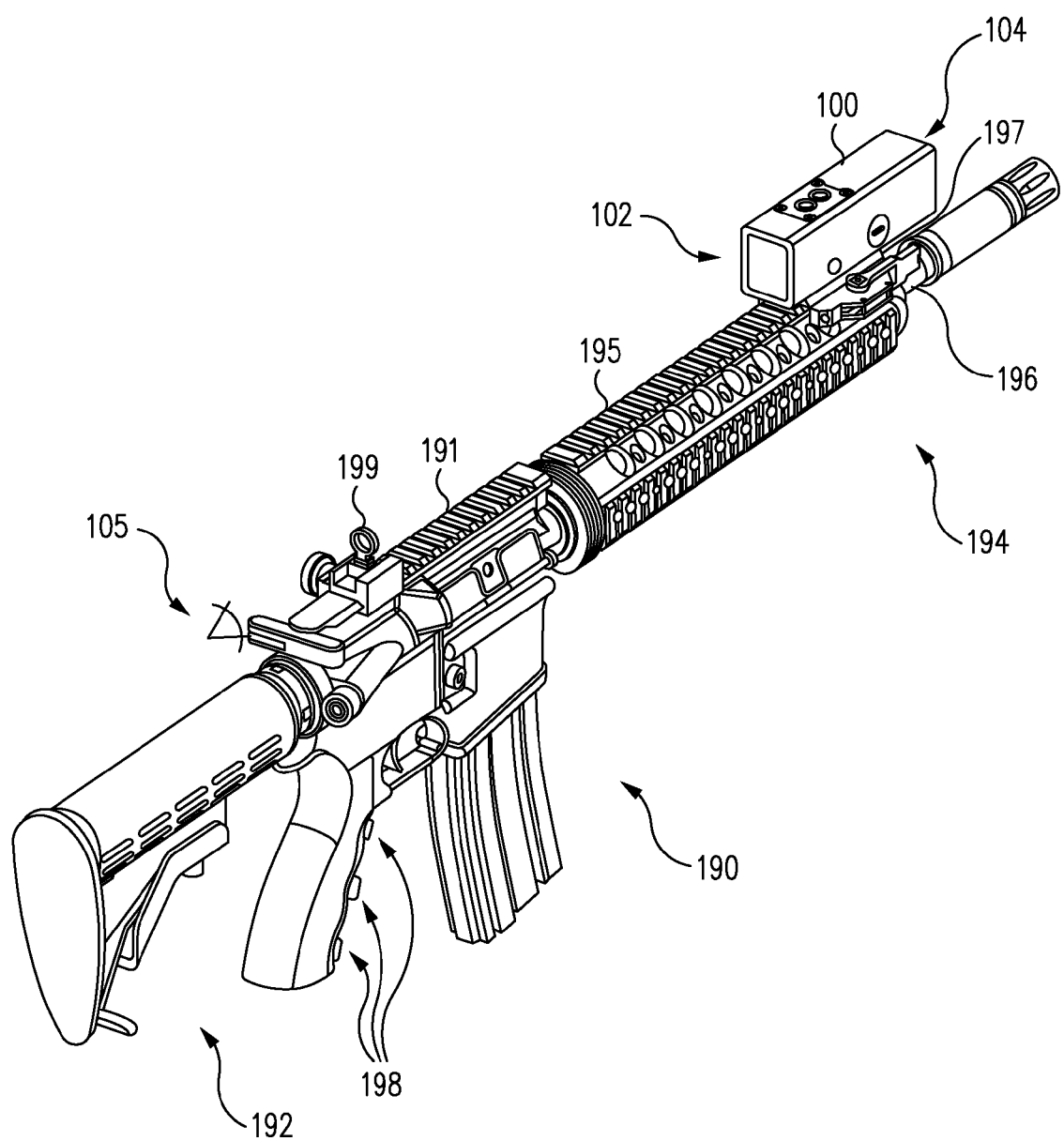
Figure 1C:
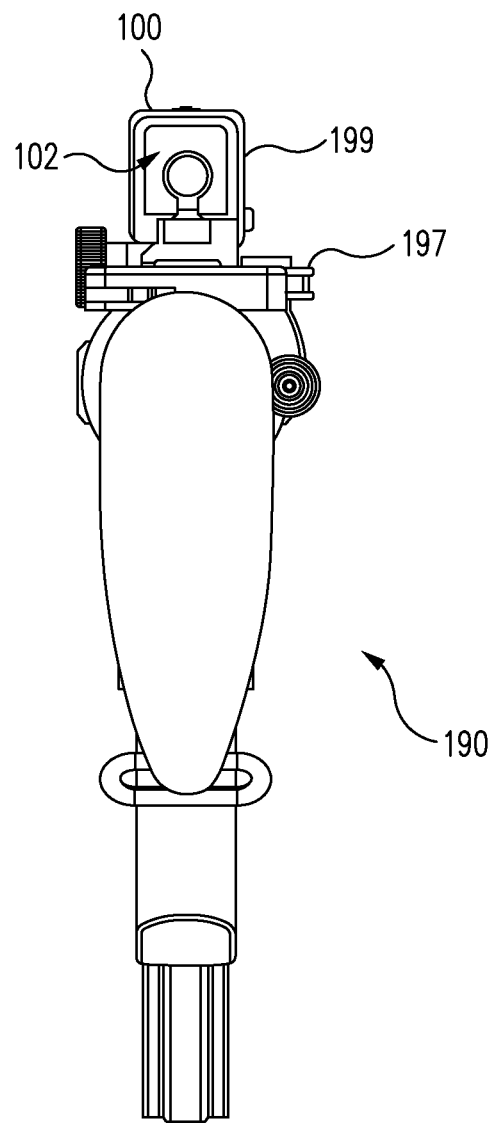

FIGS. 1A-C illustrate several views of a sight system 100 including an integrated camera mounted on a rifle 190 in accordance with various embodiments of the disclosure. When mounted on rifle 190, sight system 100 may be used as a rifle sight system. For example, in one embodiment, rifle 190 may be an M4 assault rifle as shown in FIGS. 1A-C.

In one embodiment, sight system 100 may be mounted on a rail 195, such as a Picatinny rail, using a rail clamp mount 197. In one embodiment, rail clamp mount 197 may be implemented as a rail clamp mount set forth in U.S. Pat. No. 7,712,242 entitled "RAIL CLAMP MOUNT" which is incorporated herein by reference in its entirety. Although sight system 100 is illustrated in FIGS. 1A-C as being mounted on top of rifle 190, other mounting configurations are also contemplated. For example, in another embodiment, sight system 100 may be mounted on a left or right side of rifle 190 using appropriate mount and/or rail structures (e.g., standard military rail structures or others).

In various embodiments, sight system 100 may be implemented with an integrated camera and projector. In this regard, light from a target scene may enter an end 104 of sight system 100 and may be captured by a camera and/or otherwise processed to provide images to a display of sight system 100. The images may be presented (e.g., displayed) on the display and selectively projected from an end 102 of sight system 100 toward a user 105 (e.g., illustrated by an eye corresponding to an approximate placement of a user's eye when operating sight system 100 in one embodiment). In various embodiments, such images may be zoomed images of a target scene provided by, for example, optical zoom and/or digital zoom features of a camera and/or a processing block of sight system 100.

Sight system 100 may also project a red dot or other type of reticle toward user 105. For example, in one embodiment, sight system 100 may project red light to provide a red dot that is superimposed over the images displayed by sight system 100. Sight system 100 may be implemented such that the position of the red dot relative to the images provided by the display of sight system 100 may be used to sight rifle 190.

Advantageously, sight system 100 may be selectively operated as a reflex sight and/or an occluded sight as may be desired by user 105. For example, images presented on the display of sight system 100 may be projected toward user 105 along with the red dot to permit sight system 100 to operate as a reflex sight. As another example, the red dot may be projected toward user 105 without images captured by the camera of sight system 100 to permit sight system 100 to operate as an occluded sight.

As shown in FIGS. 1A-C, an eye of user 105 may be positioned substantially near an end 192 of rifle 190 (e.g., near the typical location of a conventional rear sight), while sight system 100 is mounted near an end 194 of rifle 190 (e.g., near a barrel 196 of rifle 190). This configuration permits user 105 to use sight system 100 without compromising the user's peripheral vision or situational awareness. In this regard, when using sight system 100, user 105 looks substantially down barrel 196 of rifle 190 through an optional eyepiece 199 which be mounted, for example, on a rail 191, such as a Picatinny rail, to permit an eye of user 105 to be conveniently positioned in line with end 102 of sight system 100. In contrast to conventional scopes or conventional sight systems, sight system 100 is mounted far away from optional eyepiece 199 near end 194 of rifle 190.

Thus, when sight system 100 is used to provide a reflex sight or an occluded sight, the far mounting of sight system 100 permits user 105 to retain situational awareness. Moreover, if user 105 keeps both eyes open when operating sight system 100 (e.g., when operating sight system 100 as an occluded sight or, if desired, when operating sight system 100 as a reflex sight), one of the user's eyes may receive a substantially unobstructed view of a target area. As a result, user 105 is more likely to be aware of peripheral events and/or other activity. Such events and/or activity may be present, for example, in the user's peripheral vision. In particular, when operating sight system 100 as a reflex sight, the far mounting of sight system 100 permits user 105 to retain a field of view that is not limited to images provided by sight system 100.

As also shown in FIGS. 1A-C, one or more user controls 198 may be mounted on rifle 190. For example, user controls 198 are shown mounted on a front surface of a pistol grip of rifle 190. However, other locations are also contemplated including, for example, other surfaces of the pistol grip and/or other surfaces of rifle 190.

Figure 2A:
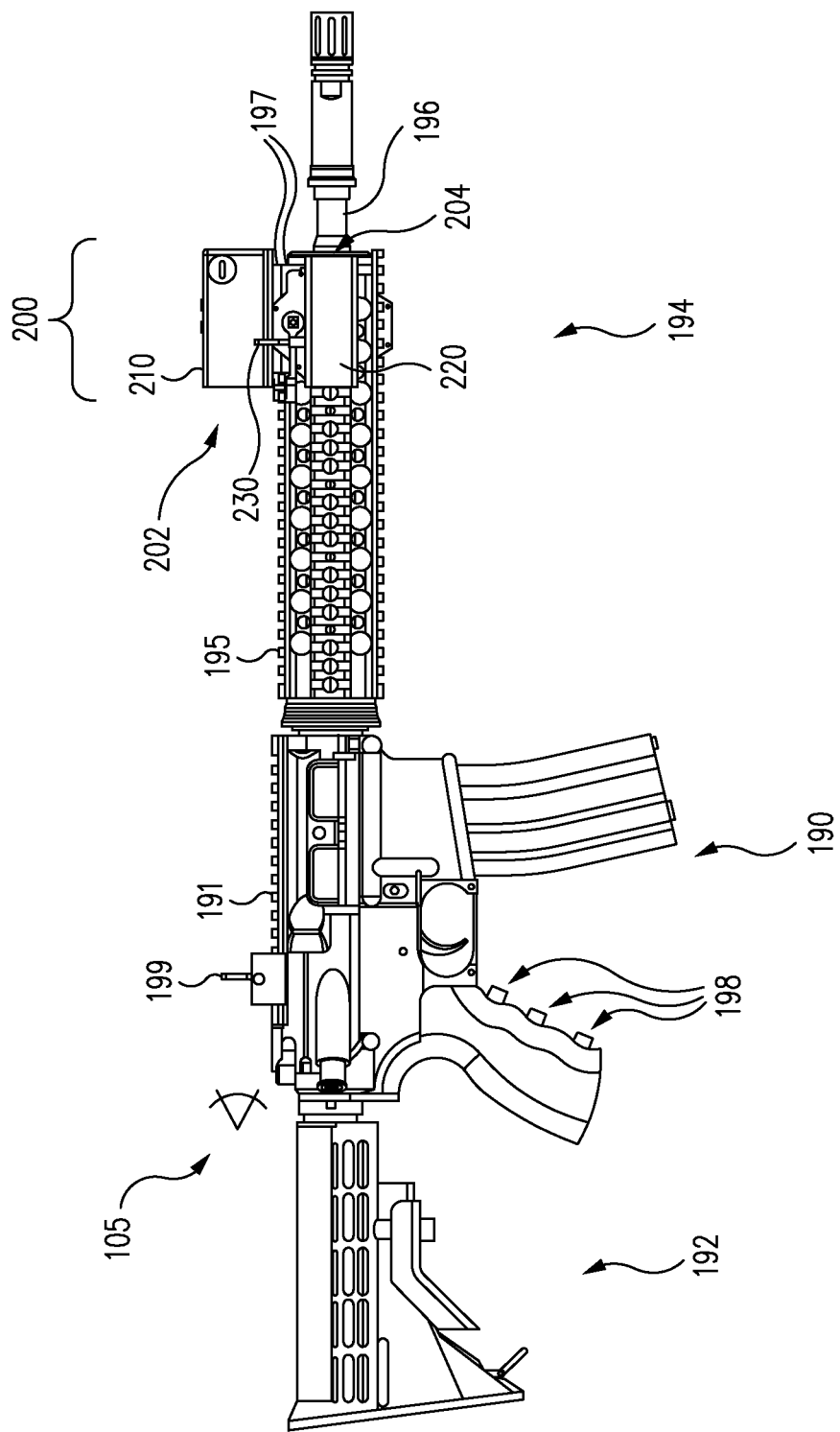
FIGS. 2A-C illustrate several views of a sight system including a projector and cameras mounted on a rifle in accordance with various embodiments of the disclosure.
Figure 2B:
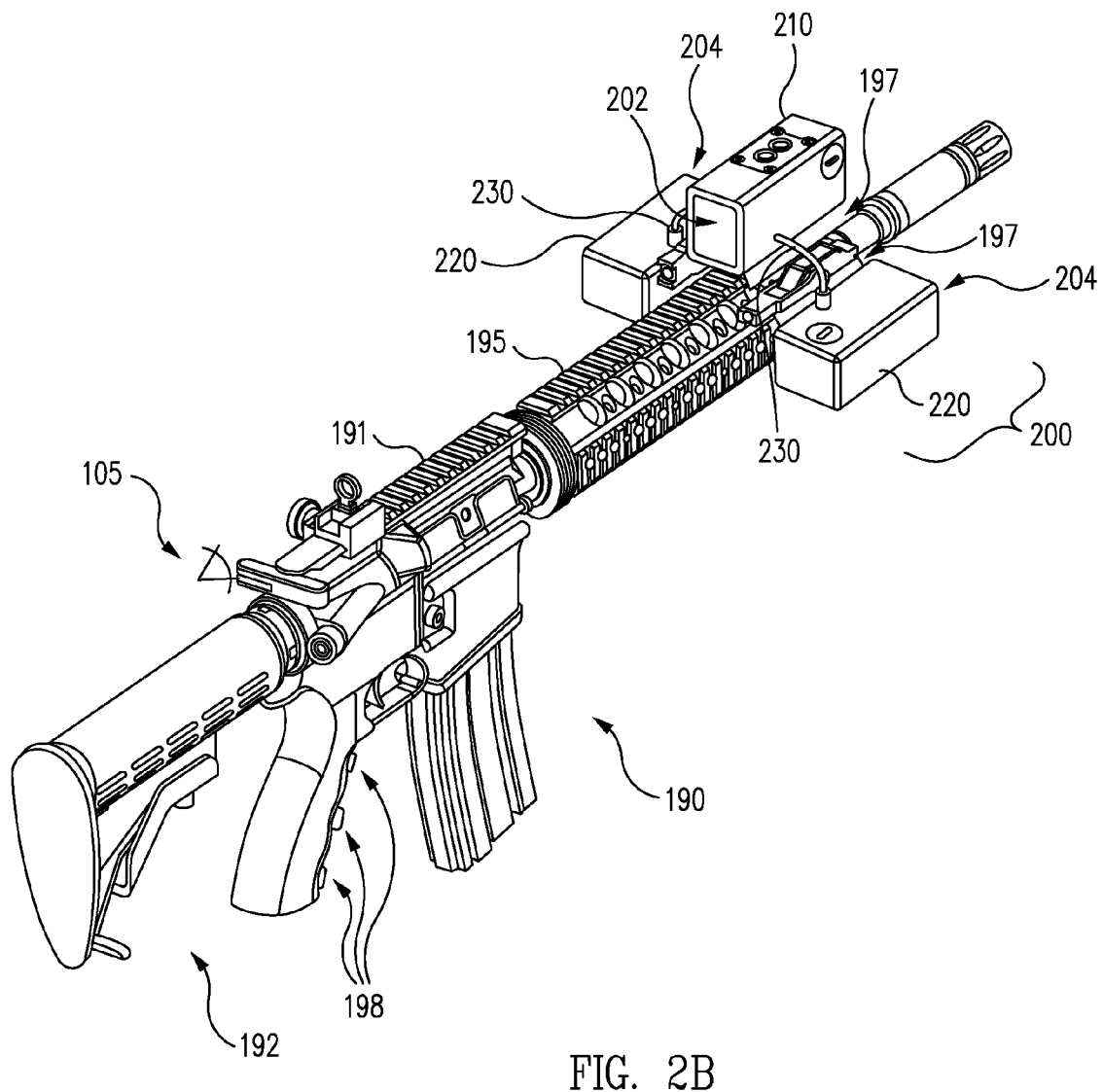
Figure 2C:
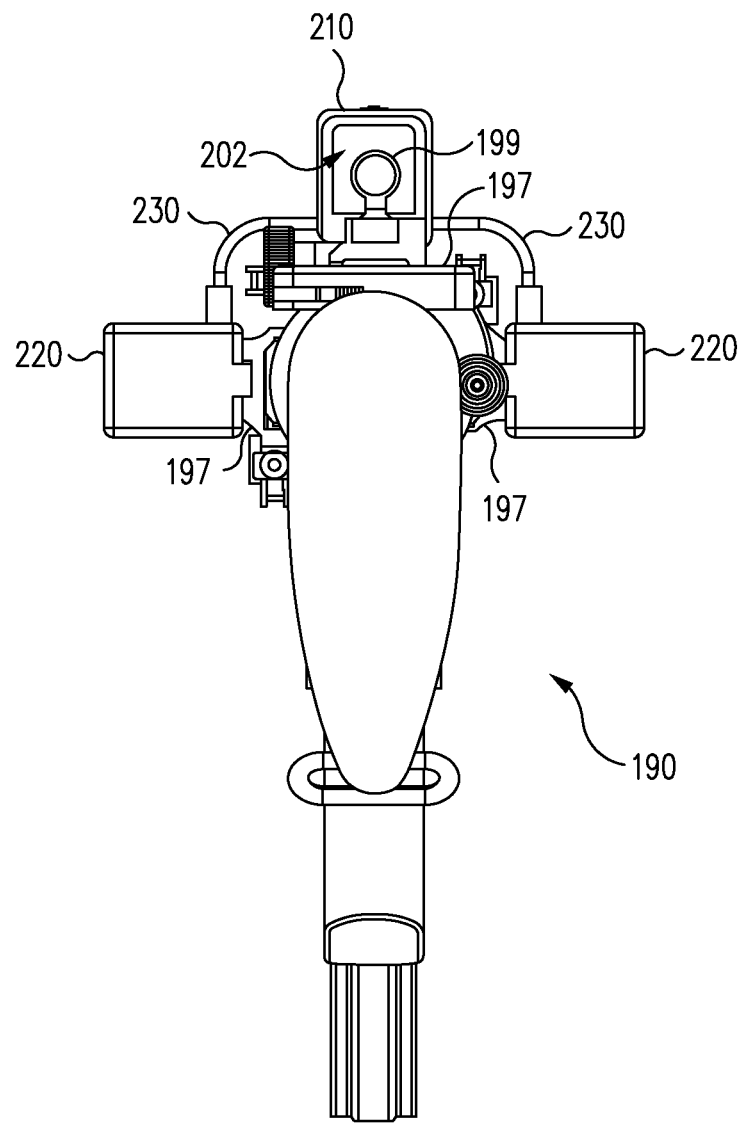

FIGS. 2A-C illustrate several views of a sight system 200 including a projector 210 and cameras 220 mounted on rifle 190 in accordance with various embodiments of the disclosure. In one embodiment, projector 210 and each of cameras 220 may be mounted on rifle 190 using one or more rail clamp mounts 197.

It will be appreciated that sight system 200 may be implemented in a similar fashion as sight system 100. In this regard, the various features described with regard to FIGS. 1A-C may be implemented in the embodiments shown in FIGS. 2A-C.

However, in contrast to sight system 100 of FIGS. 1A-C which may be implemented with an integrated camera and projector, sight system 200 of FIGS. 2A-C includes projector 210 and cameras 220 that are separate from each other. In this regard, light from a target scene may enter an end 204 of one or more of cameras 220 and may be captured by one or more of cameras 220 and/or otherwise processed to provide images. The images may be passed from cameras 220 to projector 210 through connections 230. The images may be received and/or further processed by projector 210 and then projected from an end 202 of projector 210 toward user 105.

Advantageously, the use of two cameras 220 can permit images from both of cameras 220 to be used by projector 210. For example, in one embodiment, wide images may be provided by combining images from cameras 220. In another embodiment, images from both of cameras 220 may be used for parallax correction (e.g., rangefinding) and/or focusing of cameras 220 using any of the optics and/or processing blocks described herein.

Figure 3:
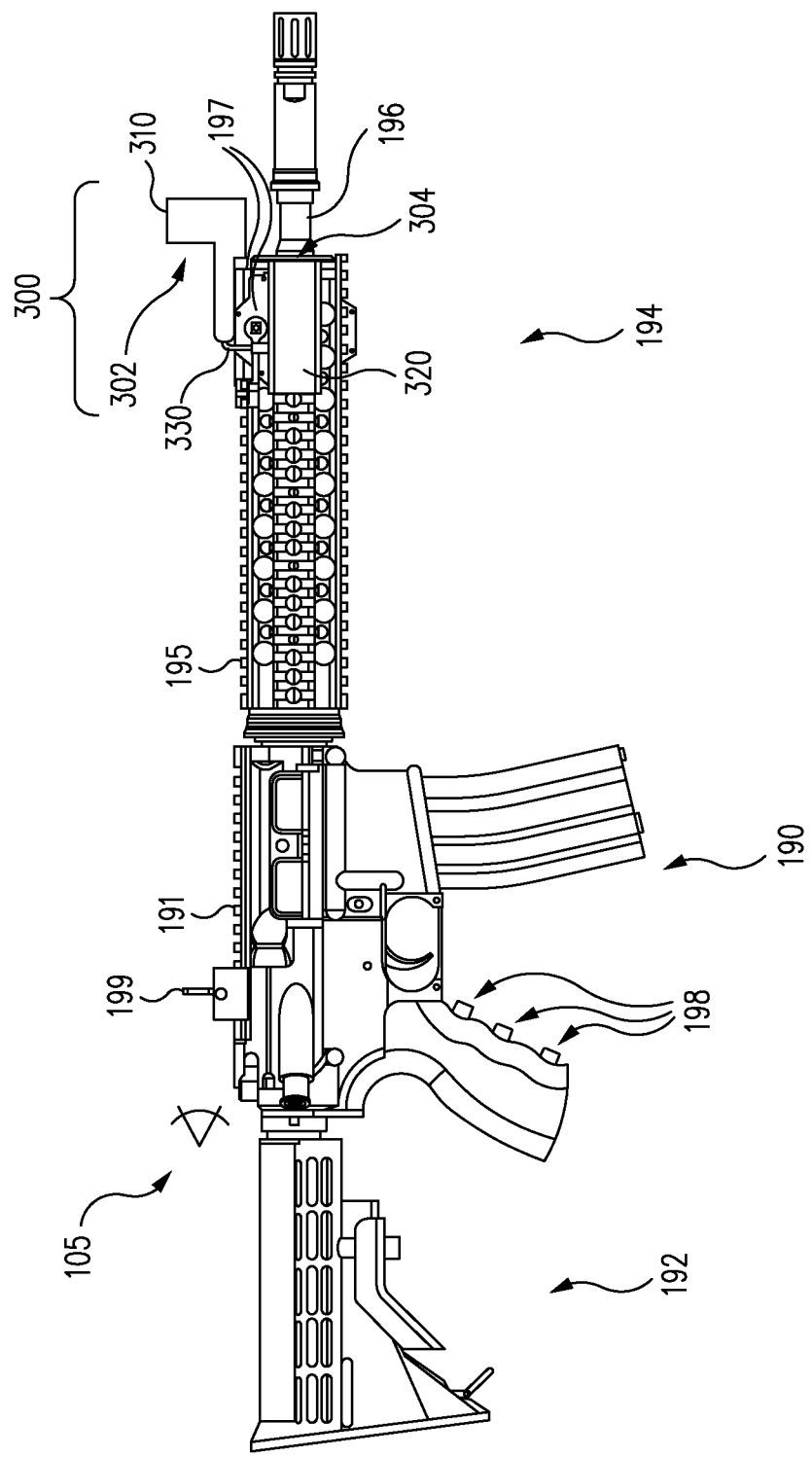
FIG. 3 illustrates a sight system including a projector having a beam splitting cube and cameras mounted on a rifle in accordance with an embodiment of the disclosure.

FIG. 3 illustrates a sight system 300 including a projector 310 having a beam splitting cube and cameras 320 mounted on rifle 190 in accordance with an embodiment of the disclosure. Although a single camera 320 is shown in FIG. 3, one or more additional cameras 320 may be positioned on a far side of rifle 190 in a similar manner as cameras 220 shown in FIGS. 2B-C. In one embodiment, projector 310 and each of cameras 320 may be mounted on rifle 190 using one or more rail clamp mounts 197.

It will be appreciated that sight system 300 may be implemented in a similar fashion as sight system 100 and/or sight system 200. In this regard, the various features described with regard to FIGS. 1A-C and 2A-C may be implemented in the embodiments shown in FIG. 3, and cameras 320 may be implemented in the manner of cameras 220.

In various embodiments described herein, beam combiners may be provided to combine images and/or substantially opaque backgrounds with one or more red dots such that the red dots are superimposed over such images and/or backgrounds. Such beam combiners may be implemented in any desired fashion such as, for example, substantially flat, substantially parabolic, and/or dichroic mirrors, reflectors, beam splitters and/or other appropriate implementations.

In addition to substantially flat or substantially parabolic beam combiners which may be used to implement sight systems 100 and/or 200 (described herein), sight system 300 of FIG. 3 may be further implemented with a beam splitting cube provided within projector 310. Projector 310 may be mounted on rail 195 using rail clamp mount 197. In one embodiment, the beam splitting cube of projector 310 may be implemented as further described herein with regard to FIG. 11.

Light from a target scene may enter an end 304 of one or more of cameras 320 and may be captured by one or more of cameras 320 and/or otherwise processed to provide images. The images may be passed from cameras 320 to a beam splitting cube of projector 310 through connections 330. The images may be received and/or further processed by projector 310 and then projected from an end 302 of projector 310 toward user 105. Projector 310 may also project a red dot from end 302 toward user 105 in accordance with any of the techniques described herein for various sight systems.

Although sight system 300 has been described using separate cameras 320, it is also contemplated that a beam splitting cube may be used in a sight system (e.g., sight system 100) having an integrated camera.

Figure 4:
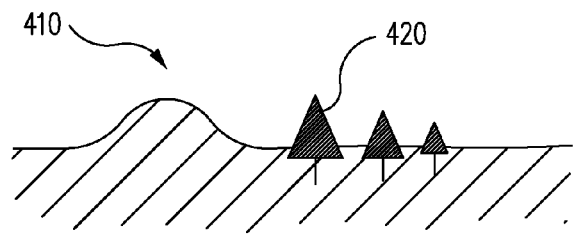
FIG. 4 illustrates a target scene in accordance with an embodiment of the disclosure.
Figure 5A:
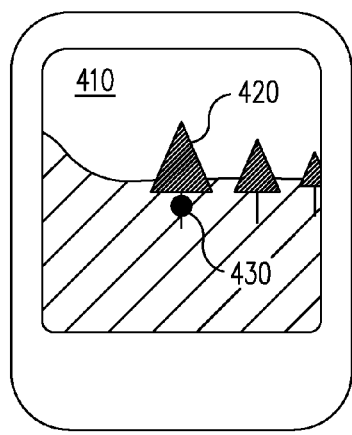
FIG. 5A illustrates a zoomed out view of the target scene of FIG. 4 using a sight system to provide a reflex sight in accordance with an embodiment of the disclosure.
Figure 5B:
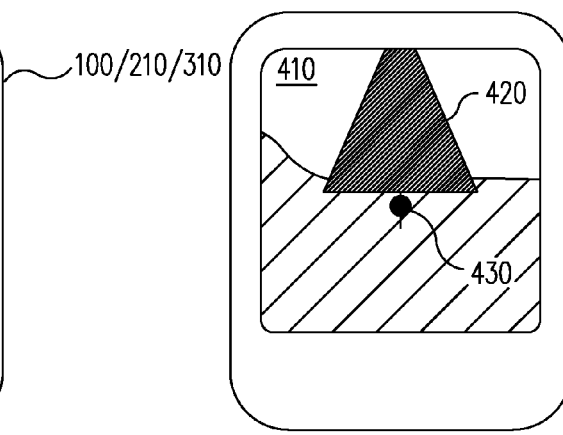
FIG. 5B illustrates a zoomed in view of the target scene of FIG. 4 using a sight system to provide a reflex sight in accordance with an embodiment of the disclosure.
Figure 6:
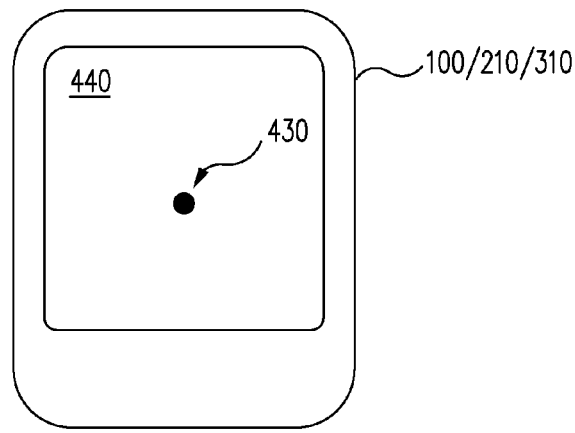
FIG. 6 illustrates a view of the target scene of FIG. 4 using a sight system to provide an occluded sight in accordance with an embodiment of the disclosure.

FIGS. 4-6 illustrate several views perceived by user 105 when operating any of sight systems 100, 200, 300, 700 (described herein), or 800 (described herein) in accordance with various embodiments of the disclosure. For example, FIG. 4 illustrates a target scene 410 in accordance with an embodiment of the disclosure. For example, target scene 410 may represent a view of a desired target area as perceived by a naked eye of user 105 (e.g., without the aid of sight system 100/200/300/700/800). As shown in FIG. 4, target scene 410 includes a target 420 which, for purposes of example, is a target that user 105 intends to strike using rifle 190.

FIGS. 5A and 5B illustrate zoomed out (e.g., no magnification) and zoomed in (e.g., magnified) views, respectively, of target scene 410 of FIG. 4 using sight system 100/200/300/700/800 to provide a reflex sight in accordance with an embodiment of the disclosure. In FIGS. 5A and 5B, images of target scene 410 are provided by a display of sight system 100/200/300/700/800 shown with a red dot 430 superimposed onto target scene 410 by sight system 100/200/300/700/800. In this regard, one or more cameras of sight system 100/200/300/700/800 provide an image of target scene 410 to a display of sight system 100/200/300/700/800 (e.g., with or without optional processing described herein). It will be appreciated that target scene 410 is shown in a zoomed out fashion in FIG. 5A and target scene 410 is shown in a zoomed in fashion in FIG. 5B (e.g., as a result of optical and/or digital zoom features of sight system 100/200/300/700/800).

FIG. 6 illustrates a view of target scene 410 of FIG. 4 using sight system 100/200/300/700/800 to provide an occluded sight in accordance with an embodiment of the disclosure. In this example, one or more cameras and/or a display of sight system 100/200/300/700/800 have been disabled (e.g., by adjusting user controls 160). As a result, images of target scene 410 are not provided by a display of sight system 100/200/300/700/800. Rather, sight system 100/200/300/700/800 provides a dark or opaque background 440 to user 105. However, sight system 100/200/300/700/800 continues to project red dot 430 to user 105 such that red dot 430 is superimposed upon background 440 as viewed by user 105 in the manner shown in FIG. 6.

In one embodiment, user 105 may use two eyes to view target scene 410 when sight system 100/200/300/700/800 is operated as an occluded sight. In this regard, a first eye of user 105 may view sight system 100/200/300/700/800 in the manner shown in FIG. 6 wherein red dot 430 is superimposed on background 440. Also in this embodiment, a second eye of user 105 may view target scene 410 in the manner shown in FIG. 4. Specifically, the second eye of user 105 may see a relatively unencumbered view of target scene 410 including target 420.

As a result, because user 105 sees a view corresponding to FIG. 6 with the first eye, and a view corresponding to FIG. 4 with the second eye, user 105 may effectively perceive a combined view corresponding to FIG. 5A even while operating sight system 100/200/300/700/800 as an occluded sight. That is, user 105 may perceive a combined view corresponding to FIGS. 4 and 6 superimposed with each other. Thus, similar to the reflex sight embodiment described above, user 105 may also adjust the alignment of rifle 190 as desired using an occluded sight embodiment to position red dot 430 over target 420 to aim rifle 190 at target 420. In one embodiment, red dot 430 may be brighter when used in the occluded sight embodiment in comparison to the reflex sight embodiment.

In one embodiment, sight system 100/200/300/700/800 may include a detector, such as an accelerometer, an audio detector, and/or any other suitable device (e.g., provided by any of the processing blocks described herein or elsewhere as appropriate), that can detect the operation of a firing mechanism (e.g., the fall of a hammer) of rifle 190. If the detector is activated, when the user pulls the trigger of rifle 190, the detector will detect the operation of the firing mechanism, and cause some feedback (e.g., a visible, audible, tactile, or other type of indication) to be output to the user at the instant rifle 190 is fired (e.g., in either dry fire or live fire operations). For example, in one embodiment, a sensor such as an accelerometer may provide one or more signals to a microcontroller (e.g., provided by any of the processing blocks described herein or elsewhere as appropriate) of sight system 100/200/300/700/800 in response to operation of the firing mechanism. In response to the one or more signals, the microcontroller may cause appropriate components of sight system 100/200/300/700/800 to provide the feedback.

The feedback provided to the user 105 may take any desired form. In one embodiment, the feedback may be in the form of red dot 430 increasing in brightness. In this regard, red dot 430 may temporarily appear brighter to user 105 through appropriate operation of a light source (e.g., light source 240, 351, 740, and/or 852 described herein) for a brief period of time. Such operation can provide user 105 with helpful visual feedback when operating sight system 100/200/300/700/800 in either dry fire or live fire applications.

In another embodiment, the feedback may be in the form of red dot 430 flashing. As a result, the user's brain registers the location of the red dot 430 relative to the target scene 410 at the instant the trigger is pulled. This allows the user to see where the rifle 190 was aimed at the instant the rifle 190 fired (e.g., in live fire applications) or would have fired (e.g., in dry fire applications).

In another embodiment, the feedback may be in the form of red dot 430 briefly changing color at the instant the rifle 190 fired (e.g., in live fire applications) or would have fired (e.g., in dry fire applications). Persons of ordinary skill in the art will understand that a wide variety of audio, visual, or tactile indicators may be used to indicate to the user the instant that the weapon is fired. In one embodiment, data regarding the location, orientation, movement, and aim point relative to a target can be collected by sensors located on the rifle 190, provided as part of sight system 100/200/300/700/800, and/or in the target scene 410 at the instant of firing. This data can then be analyzed to determine the accuracy of dry fire or live fire shots.

In one embodiment, user 105 may switch between using an occluded sight and a reflex sight. For example, user 105 may operate sight system 100/200/300/700/800 as an occluded sight to initially aim rifle 190. Thereafter, user 105 may switch sight system 100/200/300/700/800 to operate as a reflex sight (e.g., by operating user controls 160, 198, 260, 760, and/or 860) and then further aim rifle 190 using images projected by sight system 100/200/300/700/800.

Figure 7A:
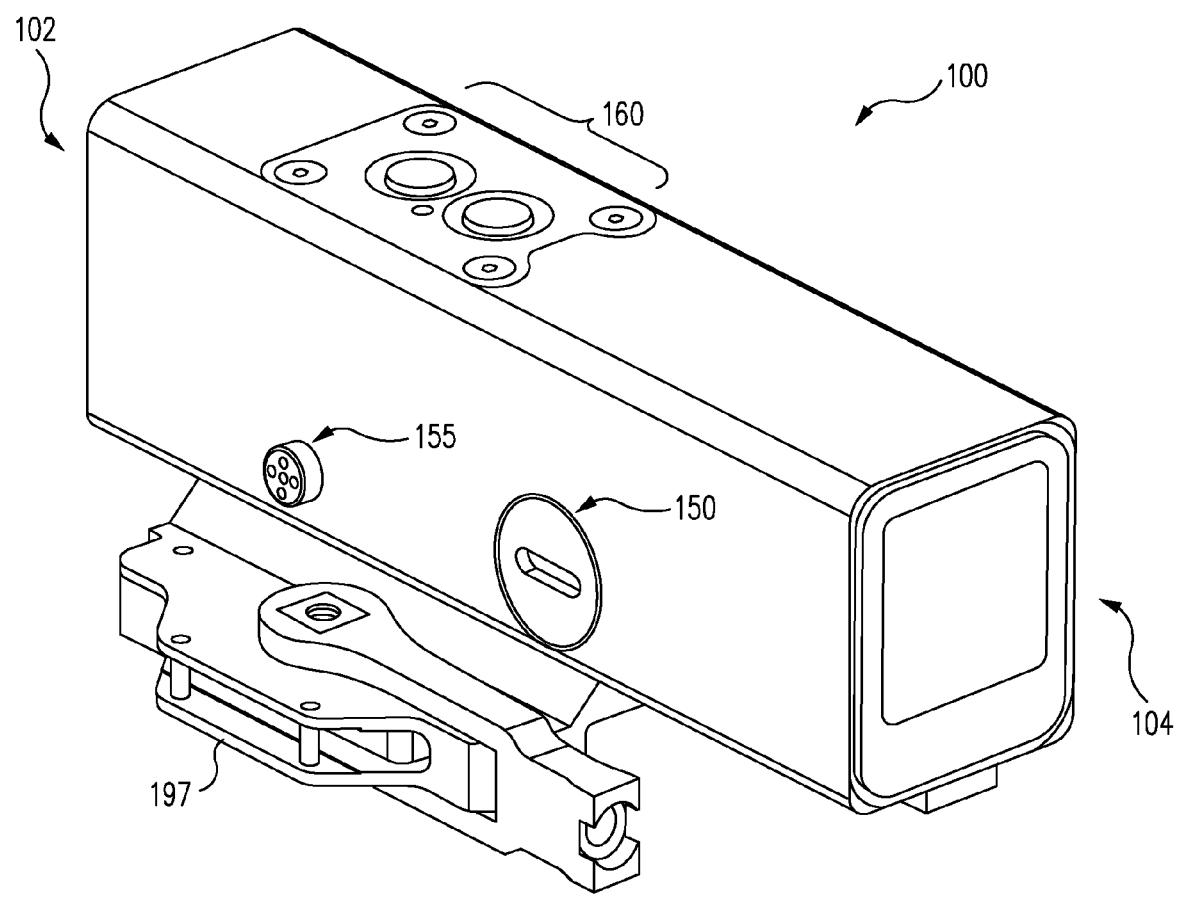
FIG. 7A illustrates a perspective view of the sight system of FIGS. 1A-C in accordance with an embodiment of the disclosure.

FIG. 7A illustrates a perspective view of sight system 100 of FIGS. 1A-C in accordance with an embodiment of the disclosure. As shown in FIG. 7A, sight system 100 includes user controls 160 which may be used to operate sight system 100 in accordance with various techniques described herein. Sight system 100 also includes a cover 150 that may be selectively removed (e.g., by user 105) to insert and/or replace a power source such as a battery. In addition, sight system 100 includes an input port 155 which may be used to receive images (e.g., video images and/or still images) from an external camera (e.g., one or more of cameras 220 and/or 320) which may be used by sight system 100 in addition to, or instead of, images provided by an integrated camera of sight system 100.

Additional implementation details of several embodiments of sight system 100 are further discussed below with regard to FIGS. 7B-C and 8A-E.

Figure 7B:
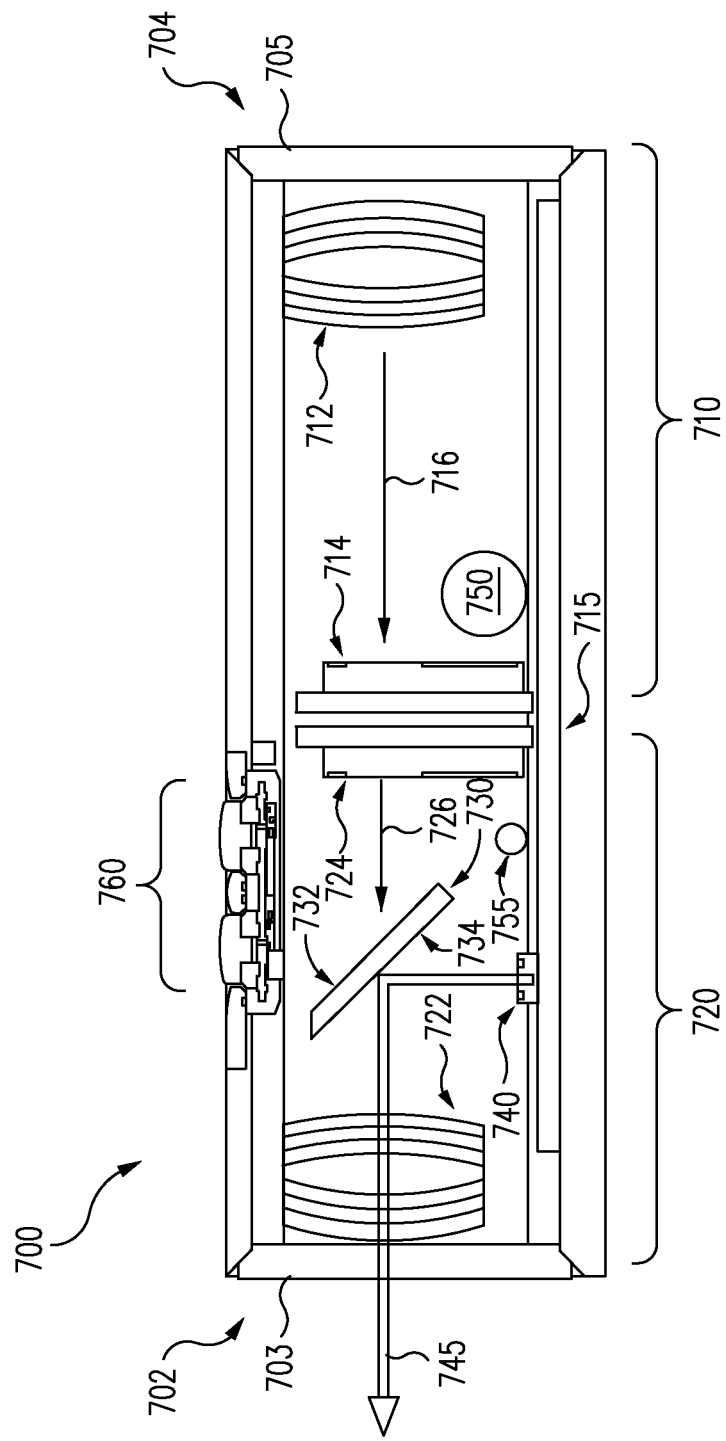
FIGS. 7B-C illustrate several views showing interior features that may be used to implement the sight system of FIGS. 1A-C with a substantially flat beam combiner in accordance with various embodiments of the disclosure.
Figure 7C:
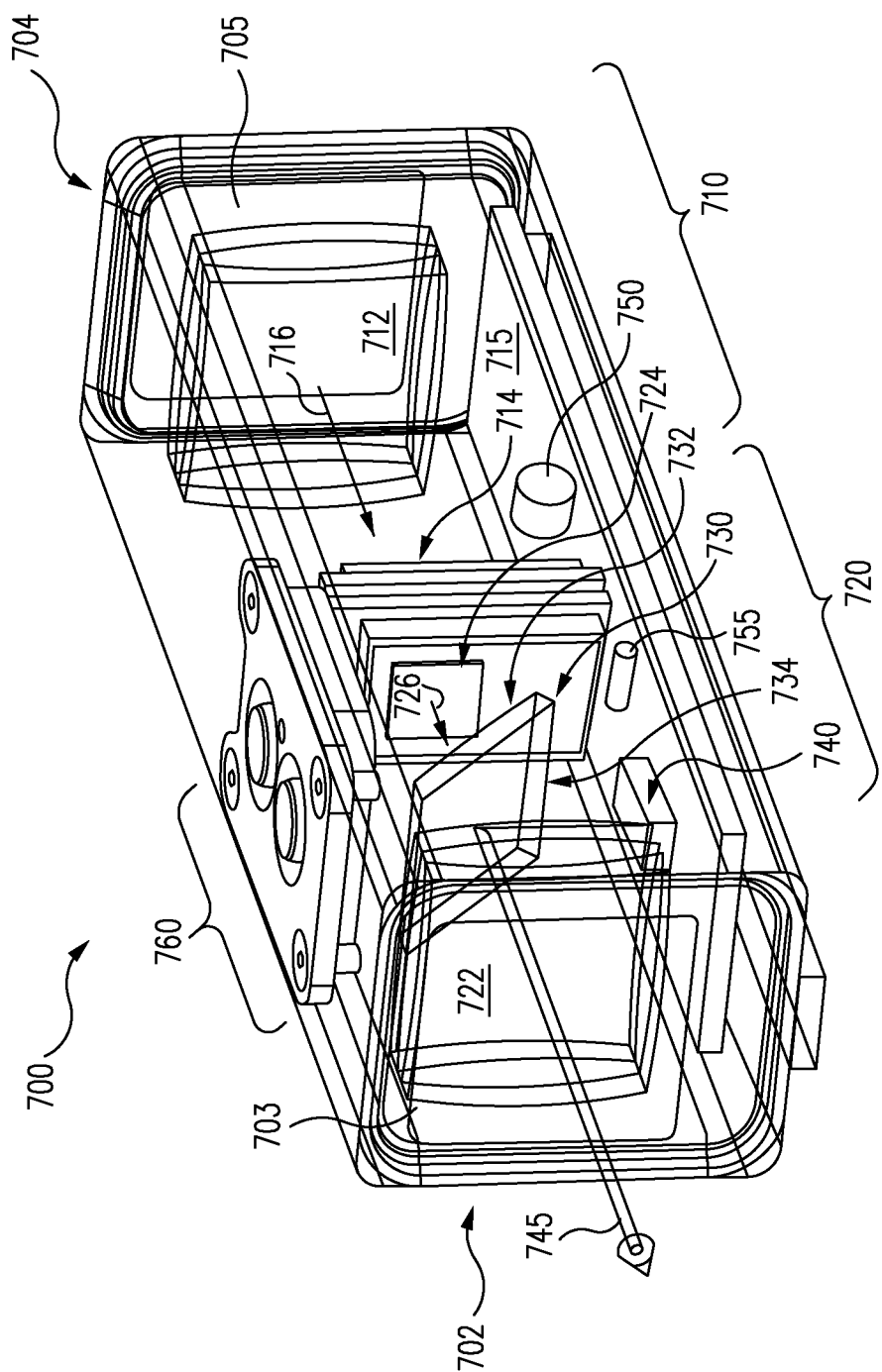

For example, FIGS. 7B and 7C illustrate side and perspective views showing interior features of a particular implementation (labeled 700) of sight system 100 using a substantially flat beam combiner in accordance with various embodiments of the disclosure. As shown in FIGS. 7B and 7C, sight system 700 includes a camera 710 for capturing images from a target scene (e.g., target scene 410) and also includes image/red dot projecting components 720 (e.g., a projector). Referring now to camera 710, light from target scene 410 enters a window 705 at an end 704 of sight system 700. The received light passes through optics 712 (e.g., focusing, collimating, and/or zoom optics for particular wavelengths) and is received (denoted by an arrow 716) by a camera sensor 714. For example, in one embodiment, optics 712 may be used to provide optical zoom features for providing zoomed images of target scene 410 to camera sensor 714. Camera sensor 714 may capture the received light to effectively capture images (e.g., zoomed or non-zoomed images) of target scene 410.

Various types of camera sensors 714 may be used. In one embodiment, camera sensor 714 may be implemented as one or more charge-coupled devices (CCDs) and/or complementary metal-oxide-semiconductor (CMOS) sensors capable of capturing desired wavelengths. For example, infrared images may be captured (e.g., to facilitate night vision applications) using an appropriate camera sensor 714 capable of capturing wavelengths in a range of approximately 0.85 to 1 microns. Advantageously, the costs associated with camera sensor 714 may be reduced by using appropriate sensors intended for visible light capture that also capture infrared wavelengths (e.g., separate visible light and infrared sensors may not be required).

In another embodiment, camera sensor 714 may be implemented as a high resolution sensor. As a result, digital zoom operations performed on images captured by camera sensor 714 may provide sufficient resolution to effectively aim rifle 190 when using sight system 700 as a reflex sight.

Various types of cameras 710 may be used. For example, in one embodiment, camera 710 may capture images of visible light. In other embodiments, camera 710 may be implemented as an infrared camera, thermal camera, hyperspectral camera, and/or another type of camera as may be appropriate in particular applications. Thus, infrared images, thermal images, and/or other types of images of any desired spectra may be captured.

Camera 710 may be implemented with additional features as may be desired in particular applications. For example, in one embodiment, camera 710 may be implemented as a focusable camera to selectively focus the captured images (e.g., by selectively adjusting optics 712 through appropriate actuators or otherwise).

Although a single camera 710 is illustrated in FIGS. 7B-C, any desired number of cameras 710 may be used. For example, in one embodiment, user 105 may select one or more integrated and/or non-integrated cameras to capture different types of images. For example, an input port 755 may be used to receive images from one or more external cameras which may be used in addition to, or instead of, images provided by camera 710 as similarly discussed with regard to input port 155.

Optionally, sight system 700 may include a processing block 715 for adjusting images captured by camera 710 using appropriate hardware and/or software in any desired manner. For example, in one embodiment, processing block 715 may adjust images captured by camera 710 to compensate for different target distances, environmental conditions, and/or other factors. In another embodiment, processing block 715 may perform digital zoom operations on captured images to provide zoomed images to display 724.

Referring now to image/red dot projecting components 720, sight system 700 includes a display 724 which may selectively display images received from camera 710, processing block 715, and/or input port 755 (e.g., received directly from camera 710, received from camera 710 through processing block 715, and/or received from one or more external cameras). Different types of displays 724 may be used. For example, in various embodiments, display 724 may be implemented as a liquid crystal display (LCD), a Digital Light Processing (DLP) display (e.g., which may provide brighter images than conventional LCD implementations in certain embodiments), an organic light emitting diode (OLED) display, a plasma display, a cathode ray tube (CRT) display, or another type of display as may be appropriate in particular applications. In one embodiment, display 724 may be implemented using any appropriate digital mirror device (DMD) available, for example, from Texas Instruments. For example, such a DMD device (e.g., a micromirror array) may be illuminated by a light source and may be may be implemented in accordance with a display 350 and a light source 351 of FIG. 11 further described herein.

In one embodiment, display 724 may be implemented with a small form factor to facilitate convenient sizing of sight system 700 for positioning on rifle 190. For example, in one embodiment, display 724 may provide a display surface of approximately one inch by one inch. However, any desired display surface size may be used in various embodiments.

Images presented by display 724 may project through a substantially flat beam combiner 730 (also referred to as a beam splitter) substantially in the direction of an arrow 726. Although a substantially flat beam combiner 730 is shown in FIGS. 7B-7C, other embodiments are also contemplated. For example, in one embodiment, beam combiner 730 may be replaced by a beam splitting cube such as a beam splitting cube 340 of FIG. 11 further described herein.

In various embodiments, beam combiner 730 may be implemented as a transparent or semi-transparent beam combiner which may pass light received from display 724 (e.g., when images are presented on display 724). In various embodiments, a surface 732 of beam combiner 730 may be coated with appropriate material to selectively pass and/or reflect desired bandwidths of light received from display 724. In one embodiment, beam combiner 730 may be implemented with one or more polycarbonate materials. Light passing through beam combiner 730 also passes through optics 722 (e.g., collimating optics) and a window 703 at an end 702 of sight system 700. Optics 722 may operate to collimate light passing through beam combiner 730. Accordingly, when viewing end 702 of sight system 700, user 105 may see images captured by camera 710.

Sight system 700 also includes a light source 740 which may be used to project, for example, red light toward beam combiner 730 to provide red dot 430. Various types of devices may be used to implement light source 740 such as, for example, light emitting diodes (LEDs), laser diodes (e.g., configured for non-lasing operation), and/or other appropriate devices. As further described herein, other techniques may be used in other embodiments to provide red dot 430 (e.g., without using light source 740).

Beam combiner 730 may cause light to be reflected substantially in the direction of an arrow 745. In various embodiments, a surface 734 of beam combiner 730 may be coated with appropriate material to selectively pass and/or reflect desired bandwidths of light received from light source 740. Light from light source 740 reflecting off of beam combiner 730 also passes through optics 722 and window 703. Optics 722 may operate to collimate light from light source 740 as red dot 430 which may be viewed by user 105.

Advantageously, red dot 430 may remain visible to user 105 when the user's eye is properly aligned with end 702 and window 703 of sight system 700. Conversely, red dot 430 may not remain visible to user 105 when the user's eye is not so aligned. Accordingly, user 105 may use sight system 700 knowing that a potential target is properly sighted when red dot 430 is viewed on the potential target.

Red dot 430 may be perceived by user 105 as being superimposed over the images provided by display 724 (e.g., as shown in FIGS. 5A and 5B). Sight system 700 may be implemented such that the position of red dot 430 relative to the images provided by display 724 may be used to sight rifle 190, thus providing a reflex sight.

Sight system 700 also includes user controls 760 (e.g., which may be used to implement user controls 160 of sight system 100). User controls 760 may be used to adjust the operation of sight system 700. For example, in one embodiment, user controls 760 may be used to selectively disable camera 710 and/or display 724. In this case, display 724 may provide only a dark or opaque background (e.g., a blank image) to user 105. User 105 may continue to receive light from light source 740 as reflected by beam combiner 730. As a result, sight system 700 may be used to provide an occluded sight with red dot 430 provided by light source 740 superimposed over a dark or opaque background of display 724 (e.g., as shown in FIG. 6).

In various embodiments, user controls 760 may be used to perform other operations such as, for example, turning light source 740 and/or sight system 700 on or off, adjusting the zoom and/or focus of camera 710, selecting one or more cameras 710 to capture images, adjusting the image processing provided by processing block 715, and/or other operations as may be desired in particular applications.

Sight system 700 also includes a power source 750 (e.g., a battery or other appropriate power source) which may be selectively inserted and/or replaced by removal of cover 150.

Figure 8A:
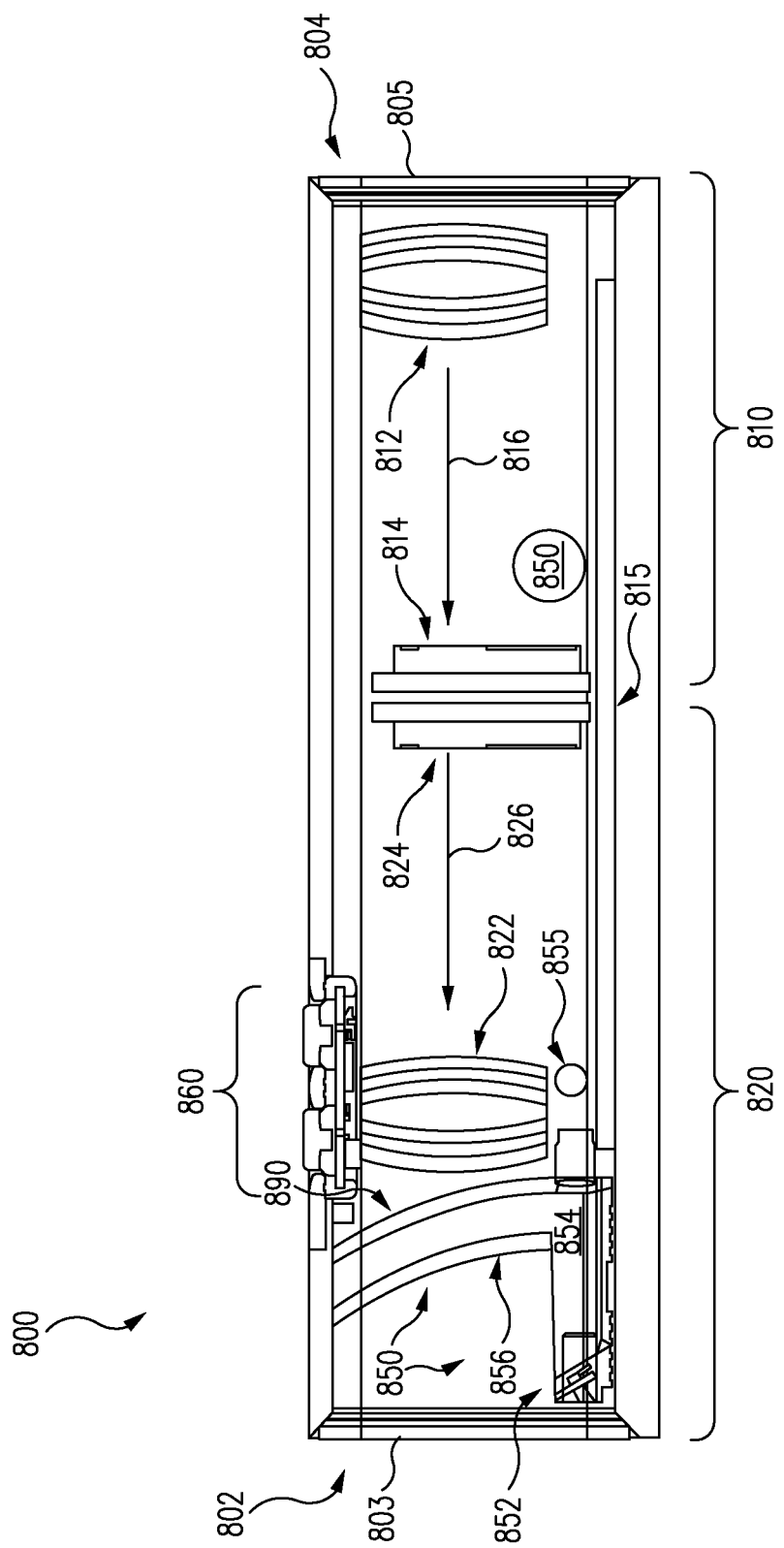
FIGS. 8A-B illustrate several views showing interior features that may be used to implement the sight system of FIGS. 1A-C with a substantially parabolic beam combiner in accordance with various embodiments of the disclosure.
Figure 8B:
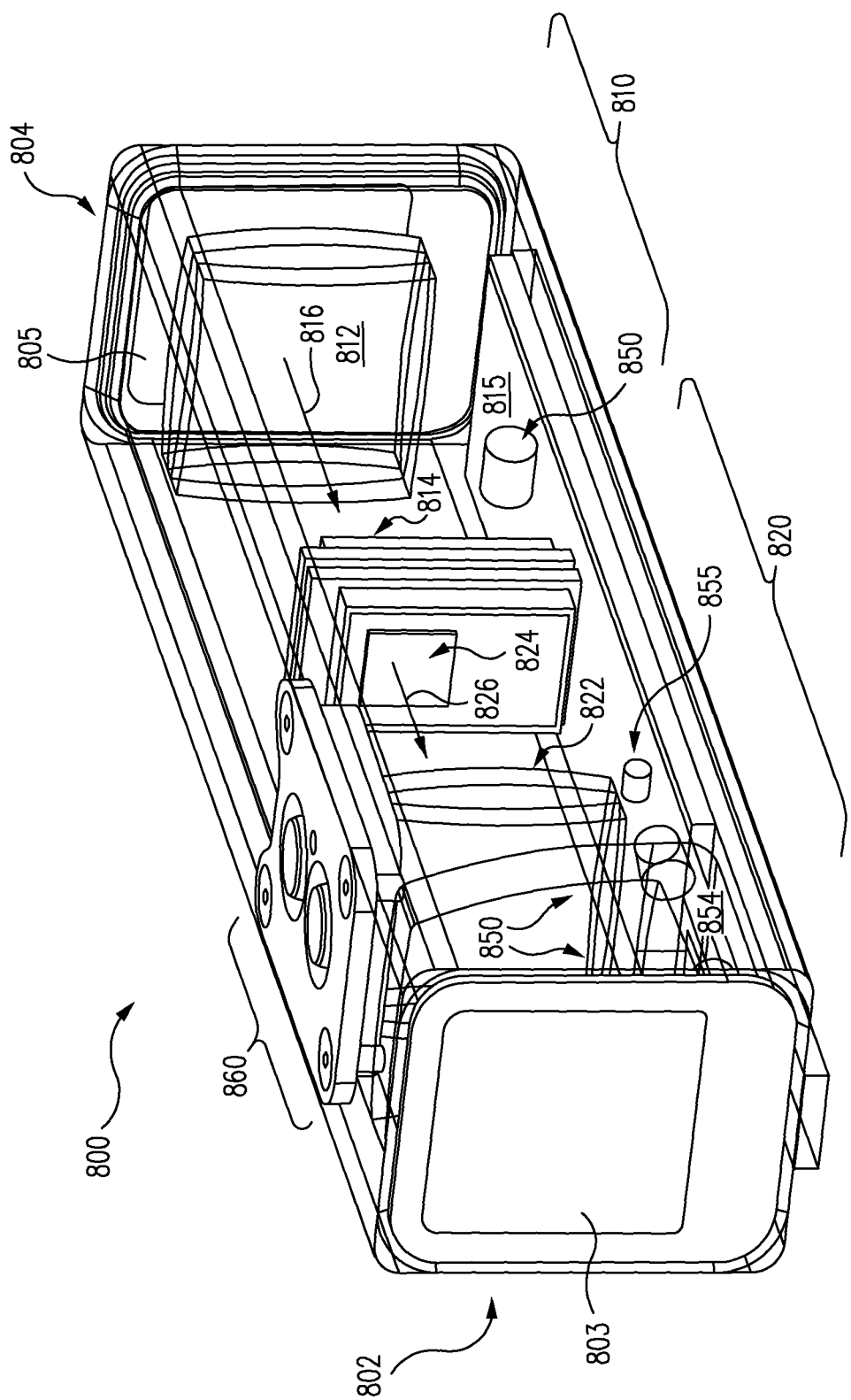

As another example, FIGS. 8A and 8B illustrate side and perspective views showing interior features of a particular implementation (labeled 800) of sight system 100 using a substantially parabolic beam combiner in accordance with various embodiments of the disclosure. As shown in FIGS. 8A and 8B, sight system 800 includes a camera 810 for capturing images from a target scene (e.g., target scene 410) and also includes image/red dot projecting components 820 (e.g., a projector). It will be appreciated that sight system 800 also includes ends 802/804, windows 803/805, a processing block 815, a power source 850, an input port 855, and user controls 860, which may be implemented in the same and/or similar manner as other corresponding features of sight system 700.

Comparing sight system 800 to sight system 700, it will be appreciated that the configuration of camera 810 may be implemented with optics 812 that pass light received (denoted by an arrow 816) by a camera sensor 814 in a similar fashion as corresponding components of camera 710 described herein. It will also be appreciated that the configuration of image/red dot projecting components 820 differs from that of image/red dot projecting components 720. In particular, image/red dot projecting components 820 include a plane wave generator 850 that includes a light source 852 and a substantially parabolic beam combiner 854 positioned between optics 822 and a window 803.

Images presented by a display 824 (e.g., implemented in the manner of display 724) may project substantially in the direction of an arrow 826 and through optics 822 (e.g., collimating optics), through beam combiner 854, and through window 803 at end 802 of sight system 800. In various embodiments, beam combiner 854 may be implemented as a transparent or semi-transparent beam combiner which may pass light received from display 824 (e.g., when images are presented on display 824). In one embodiment, beam combiner 854 may be implemented with one or more polycarbonate materials. In various embodiments, a surface 890 of beam combiner 854 may be coated with appropriate material to selectively pass and/or reflect desired bandwidths of light received from display 824. Optics 822 may operate to collimate light received from display 824. Accordingly, when viewing end 802 of sight system 800, user 105 may see images captured by camera 810.

Sight system 800 also includes a light source 852 which may be used to project, for example, red light toward beam combiner 854 which focuses and reflects the light through window 803 to provide red dot 430. Various types of devices may be used to implement light source 852 such as, for example, the types of devices described herein with regard to light source 740.

In various embodiments, a surface 856 of beam combiner 854 may be coated with appropriate material to selectively pass and/or reflect desired bandwidths of light received from light source 852. Beam combiner 854 may operate to collimate light from light source 852 as red dot 430 which may be viewed by user 105. Accordingly, when viewing end 802 of sight system 800, user 105 may see red dot 430. Similar to sight system 700, user 105 may use sight system 800 knowing that a potential target is properly sighted when red dot 430 is viewed on the potential target.

Figure 8C:
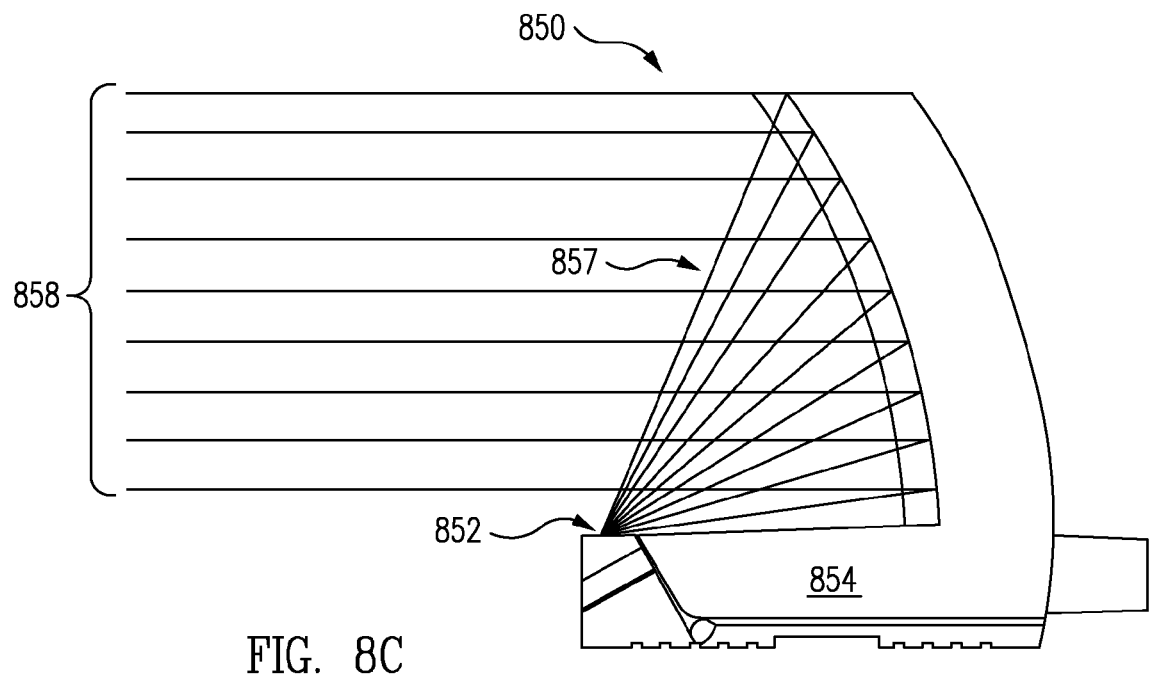
FIGS. 8C-D illustrate several views of a plane wave generator shown in FIGS. 8A-B in accordance with various embodiments of the disclosure.
Figure 8D:
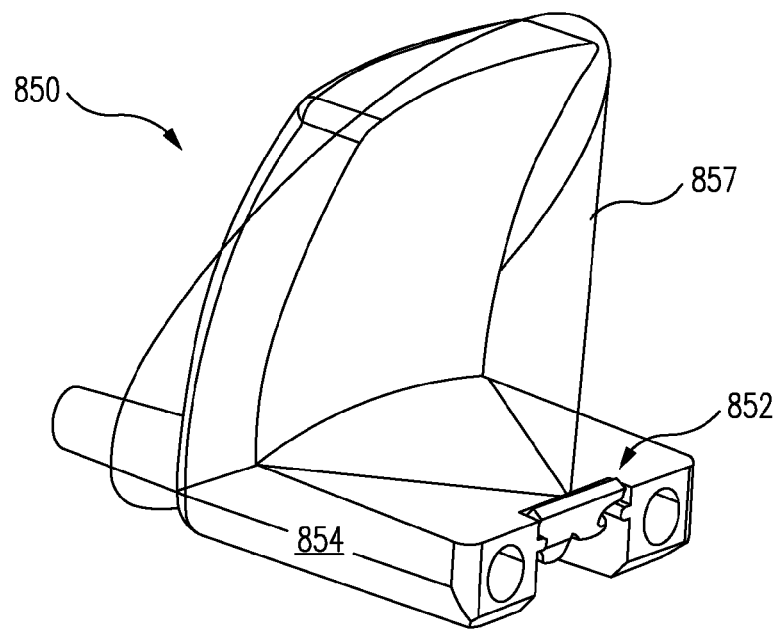

FIGS. 8C and 8D illustrate side and perspective views, respectively, of plane wave generator 850 in accordance with embodiments of the disclosure. Light 857 may be emitted by light source 852 toward beam combiner 854 at various angles in a wide coverage area. Light 857 may be reflected by beam combiner 854 as plane waves as identified by light traces 858 (e.g., ray traces), thus providing red dot 430 that may be viewed by user 105.

Red dot 430 may be perceived by user 105 as being superimposed over the images provided by display 824 (e.g., as shown in FIGS. 5A and 5B). Sight system 800 may be implemented such that the position of red dot 430 relative to the images provided by display 824 may be used to sight rifle 190, thus providing a reflex sight. Similar to sight system 700, sight system 800 may also be used to provide an occluded sight by selectively disabling camera 810 and/or display 824, for example, in response to user controls 860.

Figure 9A:
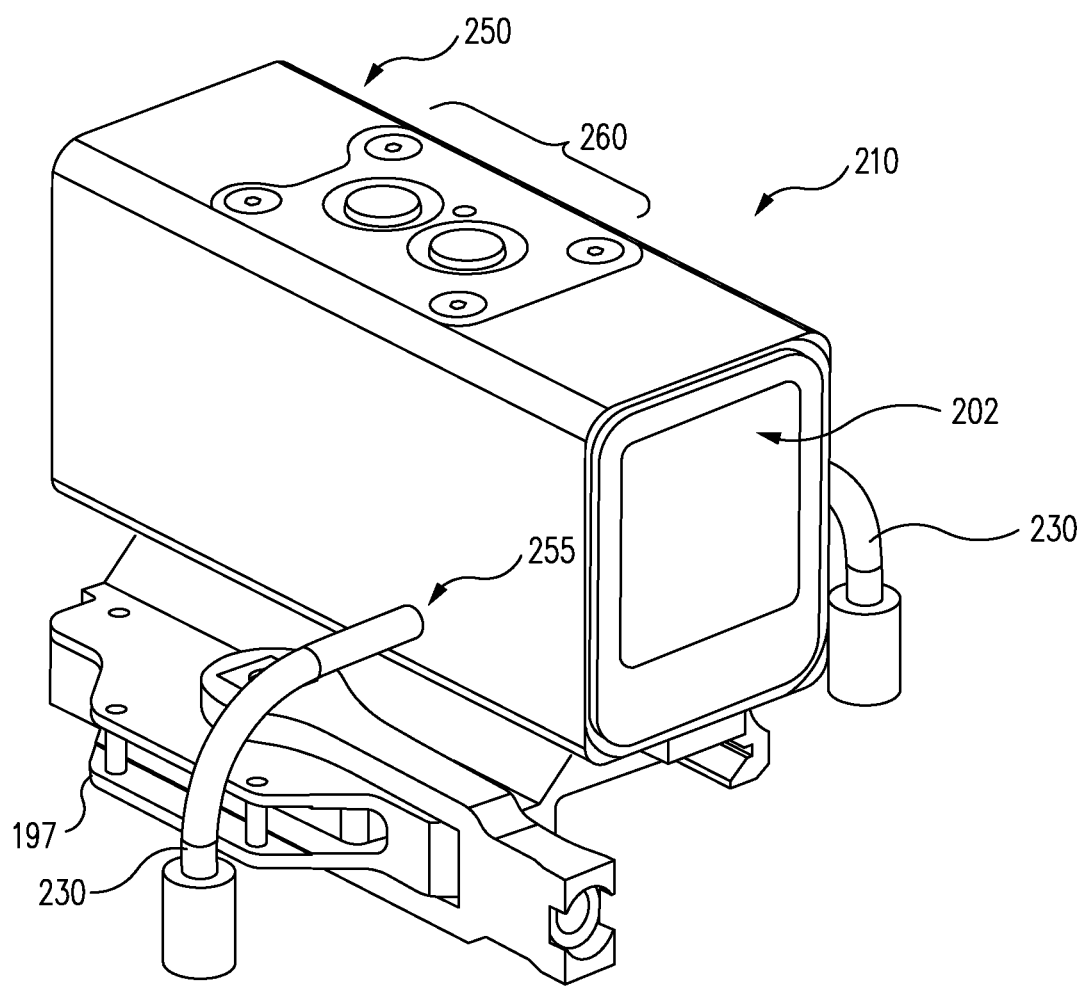
FIG. 9A illustrates a perspective view of a projector of the sight system of FIGS. 2A-C in accordance with an embodiment of the disclosure.

FIG. 9A illustrates a perspective view of projector 210 of sight system 200 of FIGS. 2A-C in accordance with an embodiment of the disclosure. In addition to various features previously described herein, FIG. 9A further illustrates user controls 260 which may be used to operate projector 210 in accordance with various techniques described herein with regard to user controls 160, 760, and 860. Projector 210 also includes a cover 250 (e.g., on the far side of projector 210 in FIG. 9A) and an input port 255 that may be used in a manner similarly described with regard to cover 150 and input port 155.

Figure 9B:
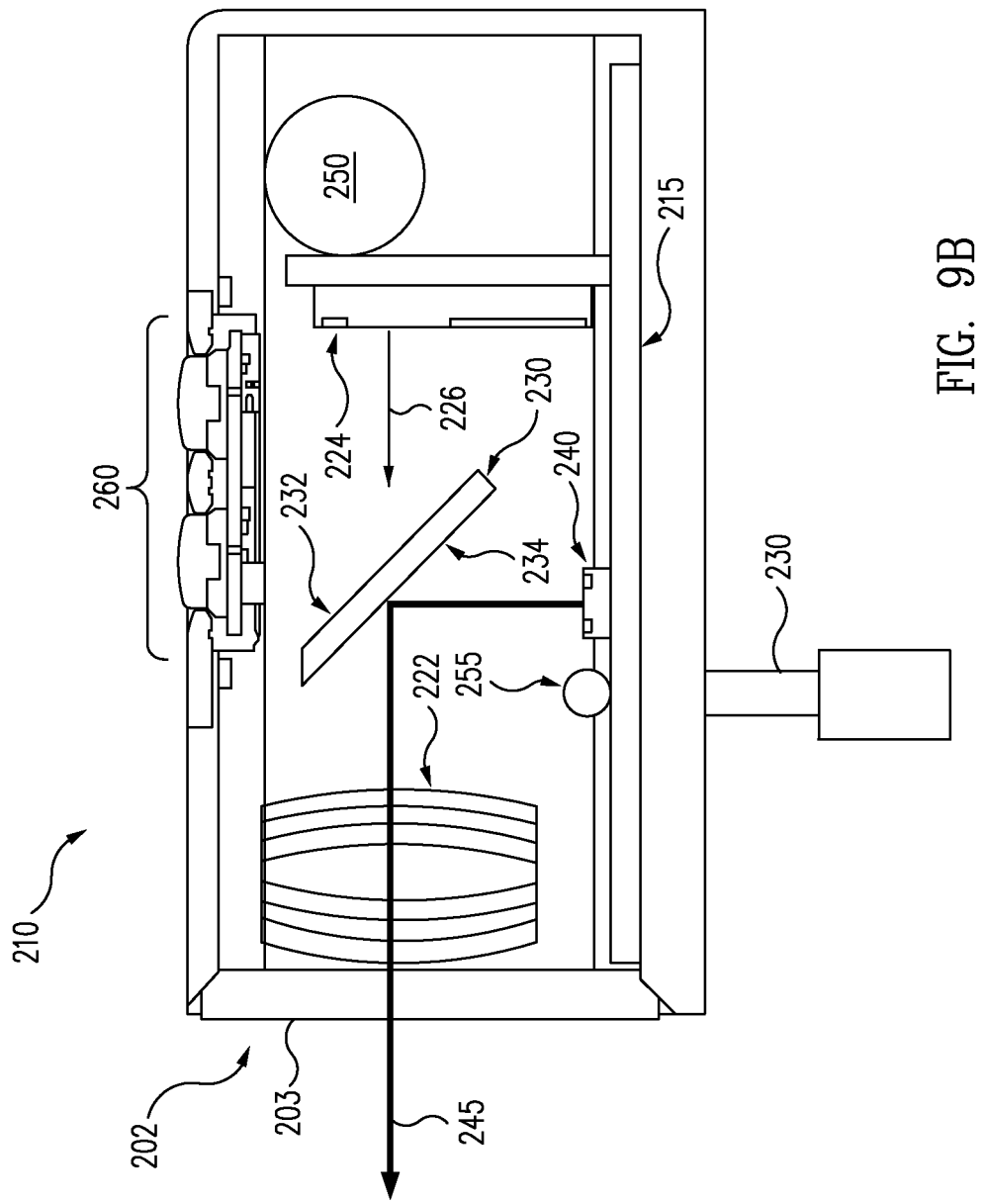
FIGS. 9B-C illustrate several views showing interior features of the projector of the sight system of FIGS. 2A-C in accordance with various embodiments of the disclosure.
Figure 9C:
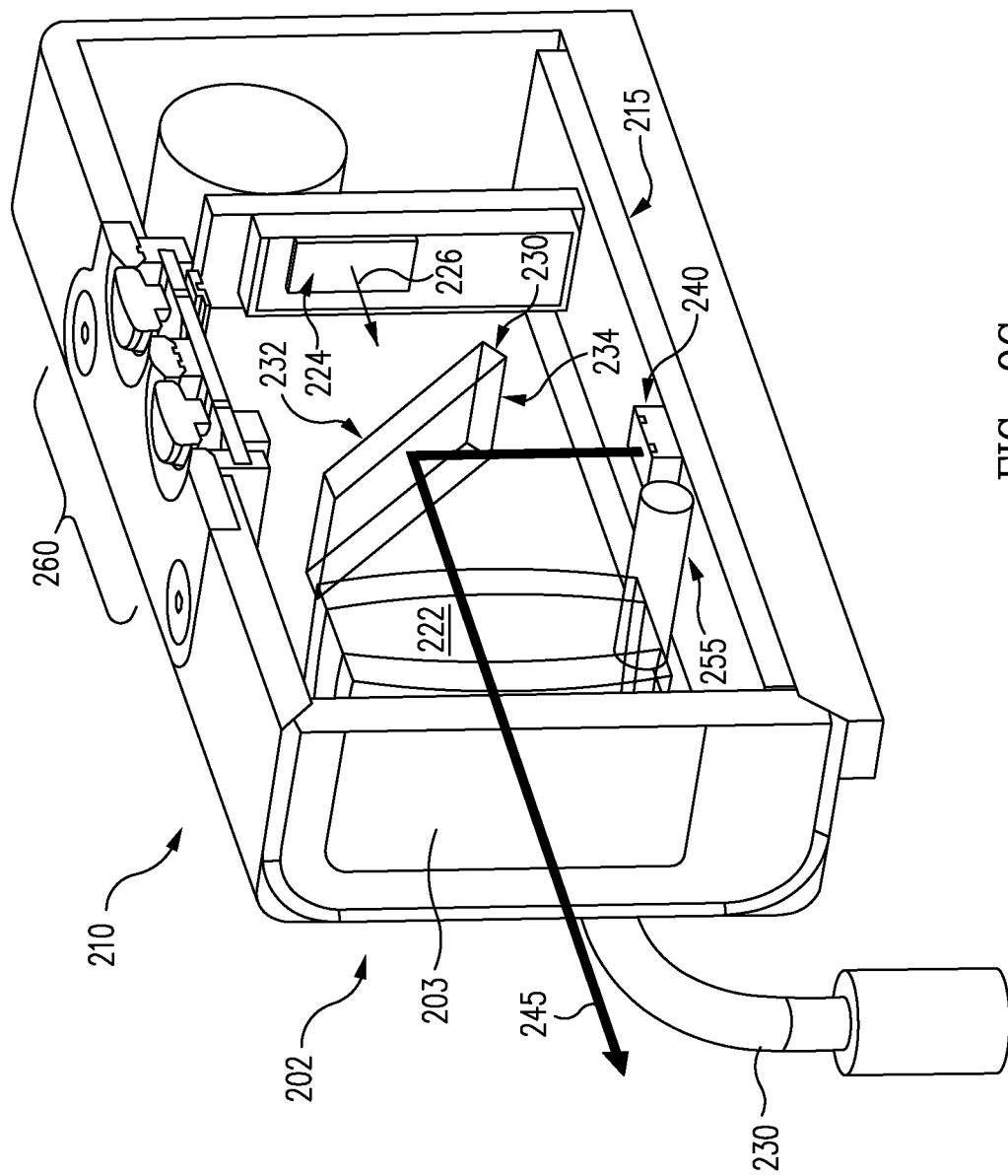

FIGS. 9B and 9C illustrate side and perspective views showing interior features of projector 210 in accordance with various embodiments of the disclosure. As shown in FIGS. 9B and 9C, projector 210 includes end 202, a window 203, a processing block 215, optics 222, a display 224, light emitted by display 224 (denoted by arrow 226), a substantially flat beam combiner 230, a surface 232, a surface 234, a light source 240, a combined image from display 224 and light source 240 (denoted by arrow 245), a power source 250, input port 255, and user controls 260, which may be implemented in the same and/or similar manner as other corresponding features of sight systems 700 and/or 800.

Accordingly, projector 210 may be used to project a red dot 430 (e.g., provided by light source 240) toward user 105. In one embodiment, red dot 430 may be superimposed over images (e.g., images received through one or more connections 230 and/or input port 255) that are also projected toward user 105 to provide a reflex sight. In another embodiment, red dot 430 may be projected without such images to provide an occluded sight.

Figure 10A:
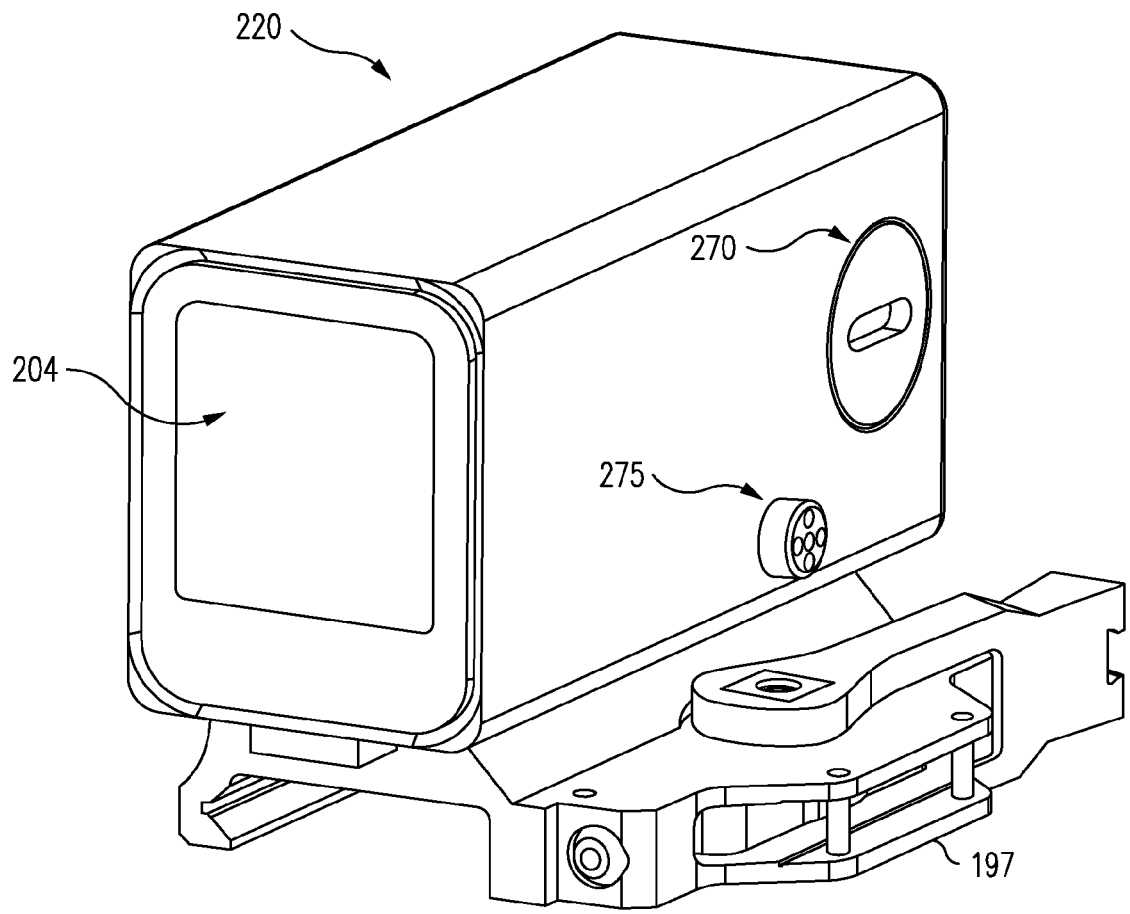
FIG. 10A illustrates a perspective view of a camera of the sight system of FIGS. 2A-C in accordance with an embodiment of the disclosure.

FIG. 10A illustrates a perspective view of camera 220 of sight system 200 of FIGS. 2A-C in accordance with an embodiment of the disclosure. In addition to various features previously described herein, FIG. 10A further illustrates a cover 270 (e.g., that may be used in a manner similarly described with regard to covers 150 and 250) and an output port 275 which may receive one or more connections 230 to pass images from camera 220 to projector 210. In various embodiments, camera 220 may be implemented to support any desired features of camera 710 described herein.

Figure 10B:
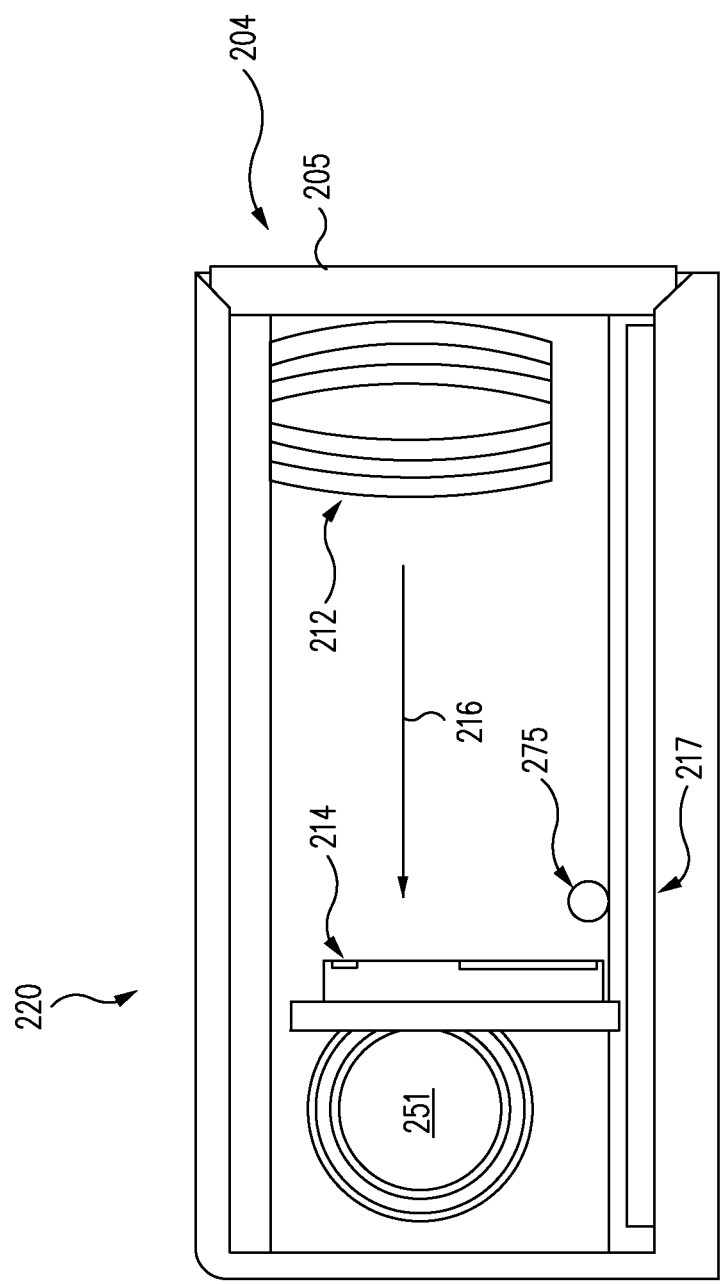
FIGS. 10B-C illustrate several views showing interior features of the camera of the sight system of FIGS. 2A-C in accordance with various embodiments of the disclosure.
Figure 10C:
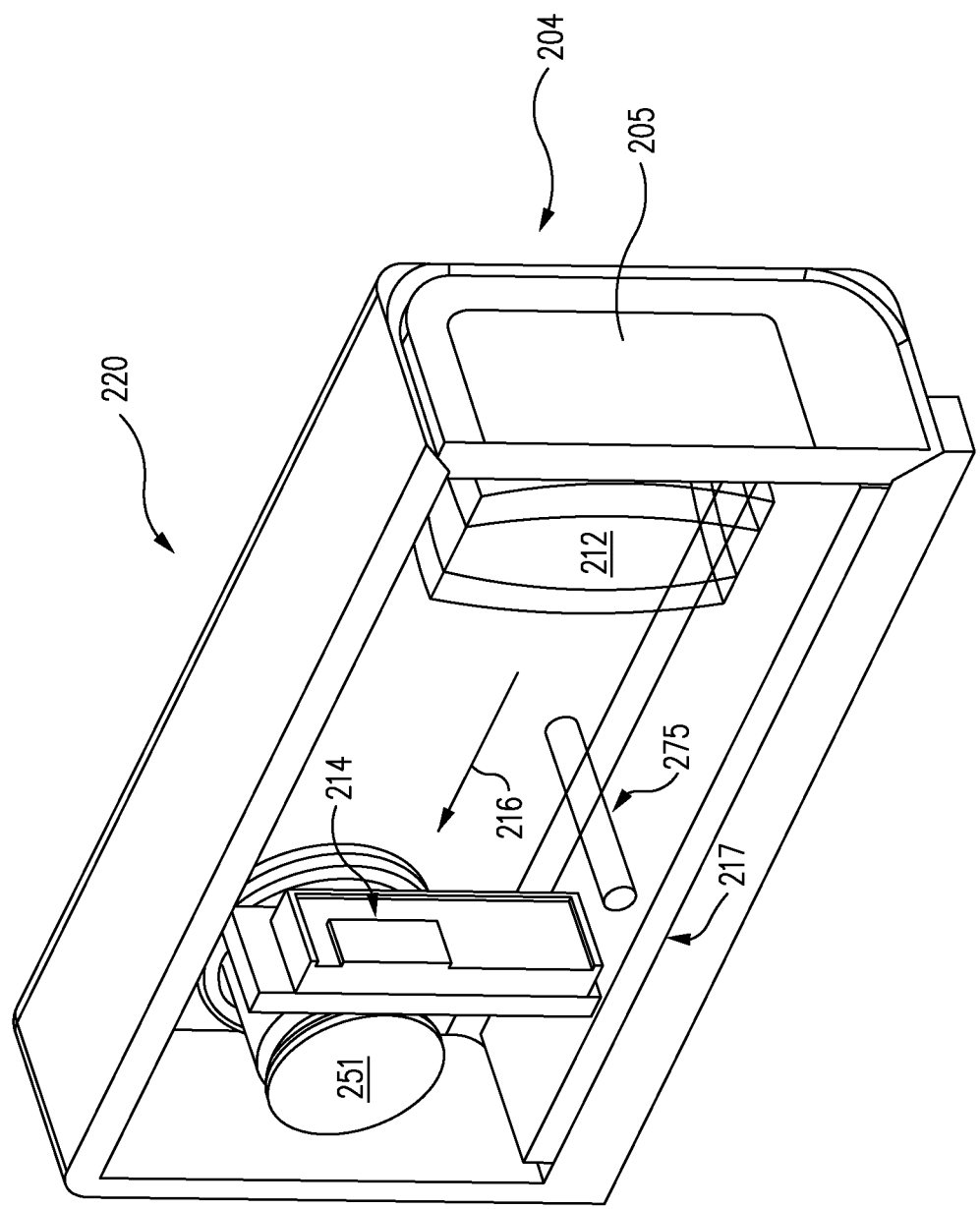

FIGS. 10B and 10C illustrate side and perspective views showing interior features of camera 220 in accordance with various embodiments of the disclosure. As shown in FIGS. 10B and 10C, camera 220 includes end 204, a window 205, optics 212, a camera sensor 214, incoming light passed to camera sensor 214 (denoted by arrow 216), a processing block 217, and a power source 251, which may be implemented in the same and/or similar manner as other corresponding features of sight systems 700 and/or 800. FIGS. 10B and 10C further illustrate output port 275 which may be implemented as described with regard to FIG. 10A. Accordingly, camera 220 may be used to capture images to be provided to projector 210 (e.g., through output port 275 and one or more connections 230) to provide a reflex sight.

Figure 11:
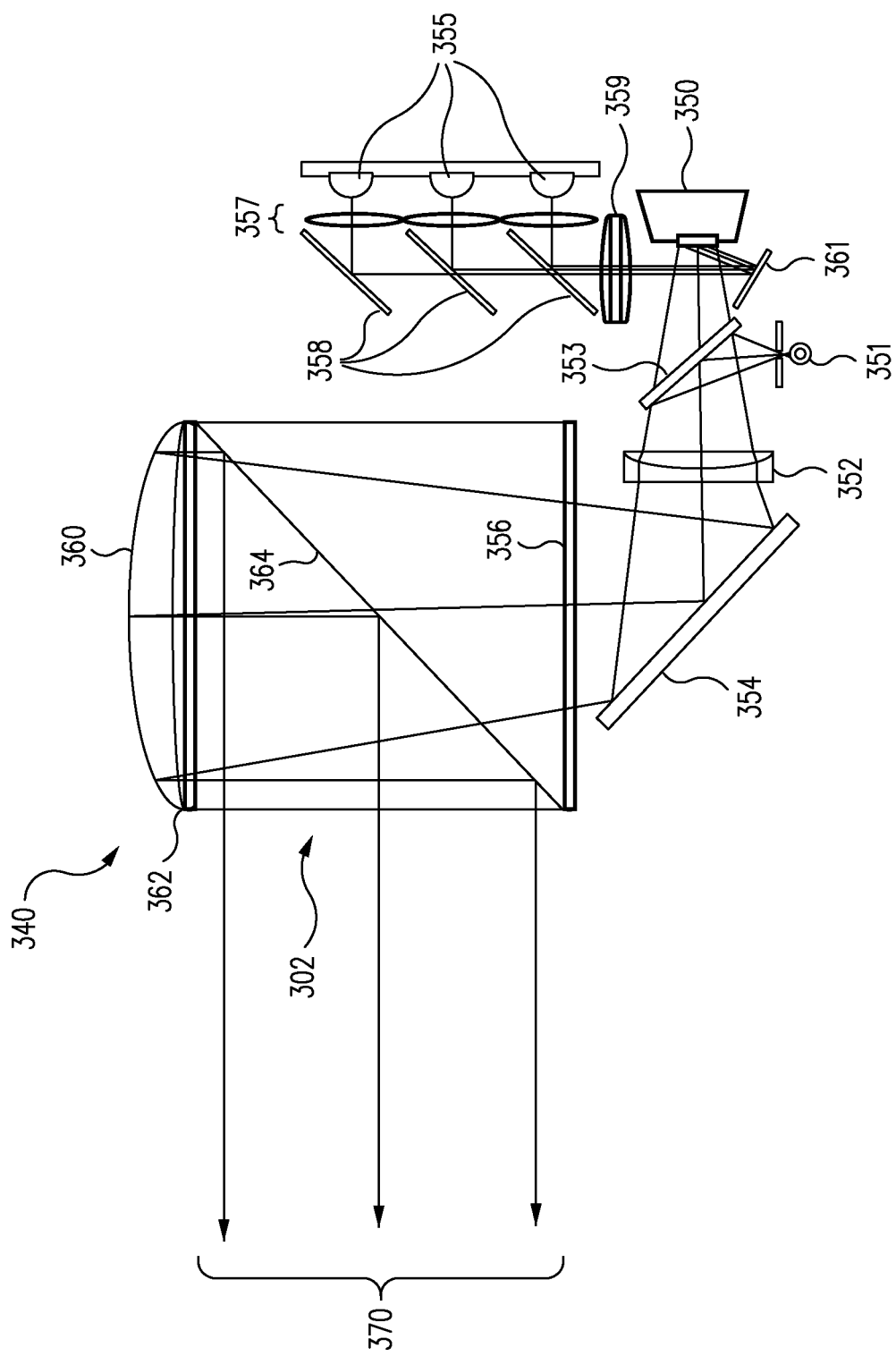
FIG. 11 illustrates a beam splitting cube and related components of the sight system of FIG. 3 in accordance with an embodiment of the disclosure.

FIG. 11 illustrates a beam splitting cube 340 and related components of the sight system 300 of FIG. 3 in accordance with an embodiment of the disclosure. A display 350 (e.g., implemented in the manner of display 724 and/or 824) may receive images from one or more cameras 320 through, for example, one or more output ports 275 and connections 330.

In one embodiment where display 350 is implemented as a DLP display, one or more light sources 355 (e.g., a plurality of LEDs such as red, green, and blue LEDs in one embodiment) may be used to illuminate micromirrors (e.g., an array of micromirrors in one embodiment) of display 350. For example, in such an embodiment, display 350 and/or various other components of FIG. 11 may be implemented using one or more display chips such as a Texas Instruments DLP1700 (480×320 display chip) or a Texas Instruments DLP 5500 (1024×768 display chip). Display 350 and light sources 355 may be positioned relative to each other in any desired fashion to facilitate illumination of the micromirrors by light sources 355. For example, in one embodiment, light provided by light sources 355 passes through lenses 357, reflects off mirrors 358 (e.g., dichroic beam combiners in one embodiment), passes through a lens 359 (e.g., a fly's eye lens in one embodiment), and reflects off a mirror 361 onto micromirrors of display 350.

Micromirrors of display 350 may reflect the light in a pattern determined by the orientations of the micromirrors to project images from display 350. In this regard, the orientations of the micromirrors may be adjusted in response to images received from one or more cameras 320. Various types of devices may also be used to implement the small image source of display 350, such as, for example, liquid crystal displays, organic and/or inorganic light emitting diode (LED) displays, or other types of devices.

Another light source 351 may be used to provide red dot 430. In this regard, light source 351 may be used to project, for example, red light toward a dichroic beam combiner 353 which reflects the light toward optics 352 (e.g., as red dot 430). Various types of devices may be used to implement light source 351 such as, for example, the types of devices described herein with regard to light sources 740 and 852.

The images provided by display 350 pass through dichroic beam combiner 353 to optics 352 (e.g., beam forming optics). The images provided by display 350 and red dot 430 provided by light source 351 pass through optics 352 and are reflected by a mirror 354 (e.g., a fold mirror) into beam splitting cube 340. The images and red dot 430 pass through an optional polarizer 356, a beam combiner 364, and an optional polarization rotator 362. The images and red dot 430 are then reflected by an image collimating optic and mirror 360 back toward beam combiner 364 which reflects the images and red dot 430 out through end 302 as denoted by arrows 370 (e.g., plane waves) for viewing by user 105.

In view of the present disclosure, it will be appreciated that various features set forth herein provide significant improvements to sight systems. In particular, by locating sight system 100, 200, 300, 700, and/or 800 substantially far away from user 105 down the barrel of rifle 190, user 105 may experience improved situational awareness in comparison with conventional sight systems. In addition, sight system 100 may be selectively configured by user 105 to operate as a reflex sight or occluded sight as may be desired in particular applications.

Although image/red dot projecting components 820 and beam splitting cube 340 have been described for generating plane waves, it is contemplated that other components and/or techniques may be used to generate plane waves where appropriate.

Although reticles implemented as red dots have been described herein, different types of light sources, beam combiners, video processors, and/or other technology may be used to provide reticles of different colors (e.g., red, green, or other colors) and/or shapes (e.g., one or more dots, crosshairs, diamonds, chevrons, marks, or other appropriate shapes) in a plane of display 350, 724, or 824 in various embodiments. For example, in one embodiment, reticles may be provided by light sources 351, 740 or 852. In another embodiment, reticles may be provided by one or more of cameras 220, 320, 710, or 810 (e.g., included in images captured by such camera). In another embodiment, reticles may be provided by software and/or hardware of processing blocks 715 or 815 (e.g., added to images captured by one or more of cameras 220, 320, 710, or 810). In another embodiment, reticles may be provided by displays 350, 724, or 824 (e.g., by displaying images that include reticles). In another embodiment, reticles may be provided on windows 203, 205, 703, 705, 803, or 805.

Other embodiments are also contemplated. For example, in one embodiment, any of the optics described herein may include aspherical lenses to correct for possible spherical aberrations in the optical paths of any of the sight systems described herein.

In another embodiment, a sight system in accordance with one or more embodiments described herein may be configured to operate with a targeting system to facilitate weapons training. In this regard, one or more electromagnetic signal sources (e.g., light sources) may be provided on a firearm and/or compatible targets to facilitate the transmission of signal to and/or from the firearm and such compatible targets to detect when a target has been hit. Advantageously, a camera of the sight system may be used to provide a record of the target as viewed by a user at the time that the firearm is fired in a dry fire and/or live fire manner.

In another embodiment, images may be transmitted from the camera in a wired and/or wireless manner to other devices such as components of a targeting system for training and/or recording purposes.

In yet another embodiment, any of the sight systems described herein may be implemented with an optical path extending through the sight system to provide user 105 with an unobstructed view (e.g., an unobstructed optical path) of a target scene while looking down barrel 196 of rifle 190 without relying on images provided by a camera. For example, an unobstructed optical path may be provided that remains available for viewing by user 105 without requiring any components of the sight systems to be moved. As another example, various components of the sight systems described herein may be implemented to move (e.g., through manual or motorized operation) out of the way to provide an unobstructed optical path for user 105.

Although various sight systems have been described with regard to rifle 190, it will be appreciated that such sight systems may be used with any type of firearm or other device where appropriate. For example, it is contemplated that such sight systems may be used with other types of firearms, rifles, weapons, or apparatus as may be desired for various applications (e.g., small arms weapons, infantry support weapons, fortification weapons, vehicles, or others weapons or apparatus). Other types of applications, such as photography, measurement, or other applications are also contemplated.

Where applicable, the various components set forth herein may be combined into composite components and/or separated into sub-components without departing from the spirit of the present disclosure. Similarly, where applicable, the ordering of various steps described herein may be changed, combined into composite steps, and/or separated into sub-steps to provide features described herein.

Software in accordance with the present disclosure, such as program code and/or data, may be stored on one or more machine readable mediums. It is also contemplated that software identified herein may be implemented using one or more general purpose or specific purpose computers, computer systems, processors, and/or other appropriate hardware, networked and/or otherwise.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:
1. A sight system comprising:
a camera adapted to capture images of a target scene; and
a projector comprising:
a display adapted to present the images, a beam combiner adapted to pass the presented images to a user of the sight system, and a light source adapted to project a reticle to the beam combiner, wherein the beam combiner is adapted to reflect the reticle to the user;

a housing, wherein the projector is disposed substantially within the housing;

a user control adapted to selectively disable at least one of the camera or the display to switch the sight system from operating as a reflex sight to operating as an occluded sight;

wherein the user control remains mounted at a fixed location relative to the housing when the sight system is operating sight and when the system is operating as the occluded sight;

wherein the beam combiner is adapted to superimpose the reticle on the images passed to the user when the sight system is operating as the reflex sight; and wherein the beam combiner is adapted to superimpose the reticle on an opaque background provided by the display when the sight system is operating as the occluded sight.

2. The sight system of claim 1, wherein the projector is adapted to increase a brightness of the reticle when the sight system is switched to operate as the occluded sight.

3. The sight system of claim 1, wherein the sight system is adapted to be mounted on a weapon.

4. The sight system of claim 3, wherein the weapon is a rifle.

5. The sight system of claim 4, wherein the sight system is adapted to be positioned on a barrel of the rifle substantially far away from the user such that the user maintains situational awareness while using the sight system.

6. The sight system of claim 1, wherein the camera is integrated with the projector.

7. The sight system of claim 1, wherein the camera is a first camera, the sight system further comprising a second camera adapted to capture additional images of the target scene to be presented by the display and passed by the beam combiner to the user.

8. The sight system of claim 7, wherein the first and second cameras are separate from the projector.

9. The sight system of claim 8, wherein the first and second cameras are adapted to be mounted on substantially opposite sides of a weapon.

10. The sight system of claim 1, wherein the camera is a visible light camera, an infrared camera, or a thermal camera.

11. The sight system of claim 1, wherein the camera comprises a sensor adapted to capture visible light images and infrared images.

12. The sight system of claim 1, wherein the camera comprises optics adapted to perform an optical zoom on the images before the images are captured by the camera.

13. The sight system of claim 1, further comprising a processing block adapted to perform a digital zoom on the images before the images are presented by the display.

14. The sight system of claim 1, further comprising optics adapted to collimate the reticle.

15. The sight system of claim 1, wherein the reticle is a red dot.

16. The sight system of claim 1, wherein the projector is adapted to increase a brightness of the reticle in response to the user pulling a trigger of a weapon.

17. The sight system of claim 1, wherein the display is a Digital Light Processing (DLP) display.

18. The sight system of claim 1, wherein the projector further comprises a beam splitting cube.

19. The sight system of claim 1, wherein the beam combiner is a substantially flat beam combiner.

20. The sight system of claim 1, wherein:
the beam combiner is a substantially parabolic beam combiner adapted to collimate the reticle; and
the beam combiner and the light source comprise a plane wave generator.

21. The sight system of claim 1, wherein the sight system is adapted to provide an unobstructed optical path through the sight system for viewing by the user.

22. A method of operating the sight system of claim 1, the method comprising:
providing the sight system of claim 1;
capturing the images of the target scene using the camera;
selectively presenting the images on the display;
passing any of the presented images through the beam combiner to the user of the sight system;
projecting the reticle from the light source to the beam combiner; and
reflecting the reticle from the beam combiner to the user.

23. The method of claim 22, further comprising:
providing the opaque background by refraining from presenting the images on the display; and
superimposing the reticle on the opaque background to provide the occluded sight to the user.

24. The method of claim 22, further comprising superimposing the reticle on the images to provide the reflex sight to the user.

25. The method of claim 22, further comprising, in response to the user control, selectively switching the sight system between:
operating as the occluded sight by providing the opaque background by refraining from presenting the images on the display and superimposing the reticle on the opaque background to provide the occluded sight to the user; and
operating as the reflex sight by superimposing the reticle on the images to provide the reflex sight to the user.

26. The method of claim 25, further comprising increasing a brightness of the reticle when the sight system is switched to operating as the occluded sight.

27. The method of claim 22, wherein the sight system is adapted to be mounted on a weapon.

28. The method of claim 27, wherein the weapon is a rifle.

29. The method of claim 28, wherein the sight system is adapted to be positioned on a barrel of the rifle substantially far away from the user such that the user maintains situational awareness while using the sight system.

30. The method of claim 22, wherein:
the camera is integrated with the projector.

31. The method of claim 22, wherein the camera is a first camera, the method further comprising:
capturing additional images of the target scene using a second camera;
selectively presenting the additional images on the display; and
passing any of the additional presented images through the beam combiner to the user.

32. The method of claim 31, wherein:
the first and second cameras are separate from the projector.

33. The method of claim 32, wherein the first and second cameras are adapted to be mounted on substantially opposite sides of a weapon.

34. The method of claim 22, wherein the camera is a visible light camera, an infrared camera, or a thermal camera.

35. The method of claim 22, wherein the camera comprises a sensor adapted to capture visible light images and infrared images.

36. The method of claim 22, further comprising performing an optical zoom on the images before the images are captured by the camera.

37. The method of claim 22, further comprising performing a digital zoom on the images before the images are presented on the display.

38. The method of claim 22, further comprising collimating the reticle using optics.

39. The method of claim 22, wherein the reticle is a red dot.

40. The method of claim 22, further comprising increasing a brightness of the reticle in response to the user pulling a trigger of a weapon.

41. The method of claim 22, wherein the display is a Digital Light Processing (DLP) display.

42. The method of claim 22, further comprising passing the images and the reticle from the beam combiner to the user through a beam splitting cube.

43. The method of claim 22, wherein the beam combiner is a substantially flat beam combiner.

44. The method of claim 22, further comprising collimating the reticle using the beam combiner, wherein the beam combiner is a substantially parabolic beam combiner, and wherein the beam combiner and the light source comprise a plane wave generator.

45. The method of claim 22, wherein the sight system is adapted to provide an unobstructed optical path through the sight system for viewing by the user.

* * * * *